(12) United States Patent
Noss

(10) Patent No.: US 10,343,069 B2
(45) Date of Patent: Jul. 9, 2019

(54) SYSTEMS AND METHODS FOR EXECUTING A TRAINING PROGRAM BASED ON PLAYER DNA

(71) Applicant: Sony Interactive Entertainment LLC, San Mateo, CA (US)

(72) Inventor: Landon Noss, Laguna Niguel, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 43 days.

(21) Appl. No.: 15/484,564

(22) Filed: Apr. 11, 2017

(65) Prior Publication Data

US 2018/0290060 A1    Oct. 11, 2018

(51) Int. Cl.

| A63F 13/47 | (2014.01) |
|---|---|
| A63F 13/55 | (2014.01) |
| A63F 13/67 | (2014.01) |
| G09B 19/22 | (2006.01) |
| A63F 13/493 | (2014.01) |
| A63F 13/798 | (2014.01) |
| A63F 13/46 | (2014.01) |

(52) U.S. Cl.
CPC .............. A63F 13/67 (2014.09); A63F 13/46 (2014.09); A63F 13/47 (2014.09); A63F 13/493 (2014.09); A63F 13/55 (2014.09); A63F 13/798 (2014.09); G09B 19/22 (2013.01)

(58) Field of Classification Search
None
See application file for complete search history.

(56) References Cited

U.S. PATENT DOCUMENTS

| 8,554,705 | B1 | 10/2013 | Sitnikau | |
|---|---|---|---|---|
| 9,744,440 | B1* | 8/2017 | Graham | A63F 9/24 |
| 2011/0118009 | A1* | 5/2011 | Bone | G07F 17/32 463/25 |
| 2014/0087882 | A1* | 3/2014 | Matsumoto | A63F 13/00 463/42 |
| 2016/0067612 | A1* | 3/2016 | Ntoulas | A63F 13/67 463/29 |
| 2017/0087460 | A1 | 3/2017 | Perry | |
| 2017/0333795 | A1* | 11/2017 | Hardee | A63F 13/67 |
| 2018/0243656 | A1* | 8/2018 | Aghdaie | A63F 13/79 |

OTHER PUBLICATIONS

PCT/US2018/025930, Int'l Search Report and Written Opinion, dated Jun. 28, 2018, EPO.

* cited by examiner

*Primary Examiner* — James S. McClellan
*Assistant Examiner* — Peter J Iannuzzi
(74) *Attorney, Agent, or Firm* — Penilla IP, APC

(57) ABSTRACT

A method for executing a training program based on player DNA is described. The method includes executing a video game and determining whether a skill level of a user is below a threshold level of play. The method includes generating a task that relates to a current level of play of the video game in which the skill level is below the threshold level and transitioning the video game to a training video game program having the task to increase the current level of play. The method includes executing the training video game program and monitoring the skill level for the task in the training video game program. The method includes determining whether the skill level for the task exceeds the threshold level. The method includes returning to an execution of the video game upon determining that the skill level for the task exceeds the threshold level.

23 Claims, 11 Drawing Sheets

SYSTEMS AND METHODS FOR EXECUTING A TRAINING PROGRAM BASED ON PLAYER DNA

FIELD

The present disclosure relates to systems and methods for executing a training program based on player DNA.

BACKGROUND

A variety of games are developed for game play. Some types of games include shooting games, kungfu games, soccer games, and adventure games. Each game involves different goals to be achieved. For example, the shooting games include achieving a certain number of points. The soccer games involve collecting game cards and achieving points.

In multi-player gaming, multiple players play these games. For example, a first player is playing against a second player, who is located geographically remote from the first player. Both the players are playing a video game of soccer and have control of virtual players of opposite teams in the video game. However, as the video game gets more difficult, it is difficult for a player to be interested in the game. A lot of players lose interest in the game.

SUMMARY

Embodiments of the present disclosure provide systems and methods for executing a training program based on player DNA.

Other aspects of the present disclosure will become apparent from the following detailed description, taken in conjunction with the accompanying drawings, illustrating by way of example the principles of embodiments described in the present disclosure.

In one embodiment, a method for attaching specific platform related metrics to user behaviors, such as achievements and time spent, is described to assist in player discovery. For example, if a user completes a game without collecting trophies, a trait is flagged. The trait is shown as a part of a profile view in a user account of the user or is stored as additional metadata to provide to game studios to utilize. By utilizing the trait-based ranking system, more accurate matchmaking systems and deep content customization is facilitated.

In an embodiment, traits, such as shooting accuracy, reaction rate, kill-to-death ratio, being team-oriented, and toxicity, are monitored. Examples of being team-oriented include being helpful and being cheerful. Moreover, an example of toxicity is making R-rated comments. By defining and aggregating specific game events, traits are attached to users. The traits are funnels that are populated in real time via a game console, which has special system wide achievements. Traits decay over time, so if a user does not play, continued efforts, such as training sessions, to maintain a given game score are made.

In one embodiment, a method for executing a training program based on player DNA is described. The method includes executing a video game and determining, during the execution of the video game, whether a skill level of a user is below a threshold level of play. The method includes generating a task that relates to a current level of play of the video game in which the skill level is below the threshold level and transitioning the video game to a training video game program having the task to increase the current level of play. The method includes executing the training video game program and monitoring the skill level for the task in the training video game program. The method includes determining, during the execution of the training video game program, whether the skill level for the task exceeds the threshold level. The method includes returning to an execution of the video game upon determining that the skill level for the task exceeds the threshold level.

In an embodiment, a server including a processor for executing a training program based on player DNA is described. The processor is configured to execute a video game and determine, during the execution of the video game, whether a skill level of a user is below a threshold level of play. The processor is further configured to generate a task that relates to a current level of play of the video game in which the skill level is below the threshold level. The processor is configured to transition the video game to a training video game program having the task to increase the current level of play. The processor is further configured to execute the training video game program and monitor the skill level for the task in the training video game program. The processor is configured to determine, during the execution of the training video game program, whether the skill level for the task exceeds the threshold level. The processor is configured to return to an execution of the video game upon determining that the skill level for the task exceeds the threshold level. The system further comprises a memory device coupled to the processor for storing the skill level and the threshold level.

Some advantages of the herein described systems and methods for executing a training program based on player DNA include executing a training video game based on a trait level or a skill level of a user. For example, during execution of the video game, it is determined whether the trait level or the skill level is not satisfactory, e.g., below a threshold level or a pre-determined level. Upon determining that the trait level or the skill level is unsatisfactory, a training video game is executed to increase the trait level or the skill level of the user. The training video game maintains interest of the user in learning the video game. Also, when the user continues to play the video game after the increase in the skill level or the trait level, the user becomes interested in playing the video game.

Other advantages of the herein described systems and methods for executing a training program based on player DNA include reducing network traffic in which game data is transferred over a computer network. If a user does not fulfill a specific task in a video game or maintain a level, such as a trait level or a skill level, within the video game, the user will lose interest and will not continue playing the video game. In that case, the user will access other video games or will access the same video game at a later time. The user usually logs out when the user does not want to continue playing the video game. Each time the user accesses the other video game or the same video game in another game session, such as after logging out, there is an increase in network traffic for transferring data for displaying the other video game or the same video game. Games are becoming more graphics intensive and that increases the network traffic. The user keeps on trying additional games until the user feels that he/she is skilled at one of those additional games. Graphics of these additional games increase the network traffic. Networks have limited bandwidth and may not be able to handle provision of the additional video games at a frequency with which the user wishes to try playing the additional video games. By providing the methods and systems, described herein, a training video game is executed when the user is at an unsatisfactory trait level or at an unsatisfactory skill level during a play of a video game. The training video game trains the user to increase the skill level or the trait level and keeps the user interested in the video game. Once the skill level or the trait level is increased to a satisfactory level, the execution of the video game continues. Accordingly, there is no need for the user to access the other video game or the same video game after logging out of the video game. As such, the network traffic is not increased.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for executing a training program based on player DNA are described. It should be noted that various embodiments of the present disclosure are practiced without some or all of these specific details. In other instances, well known process operations have not been described in detail in order not to unnecessarily obscure various embodiments of the present disclosure.

Figure 1:
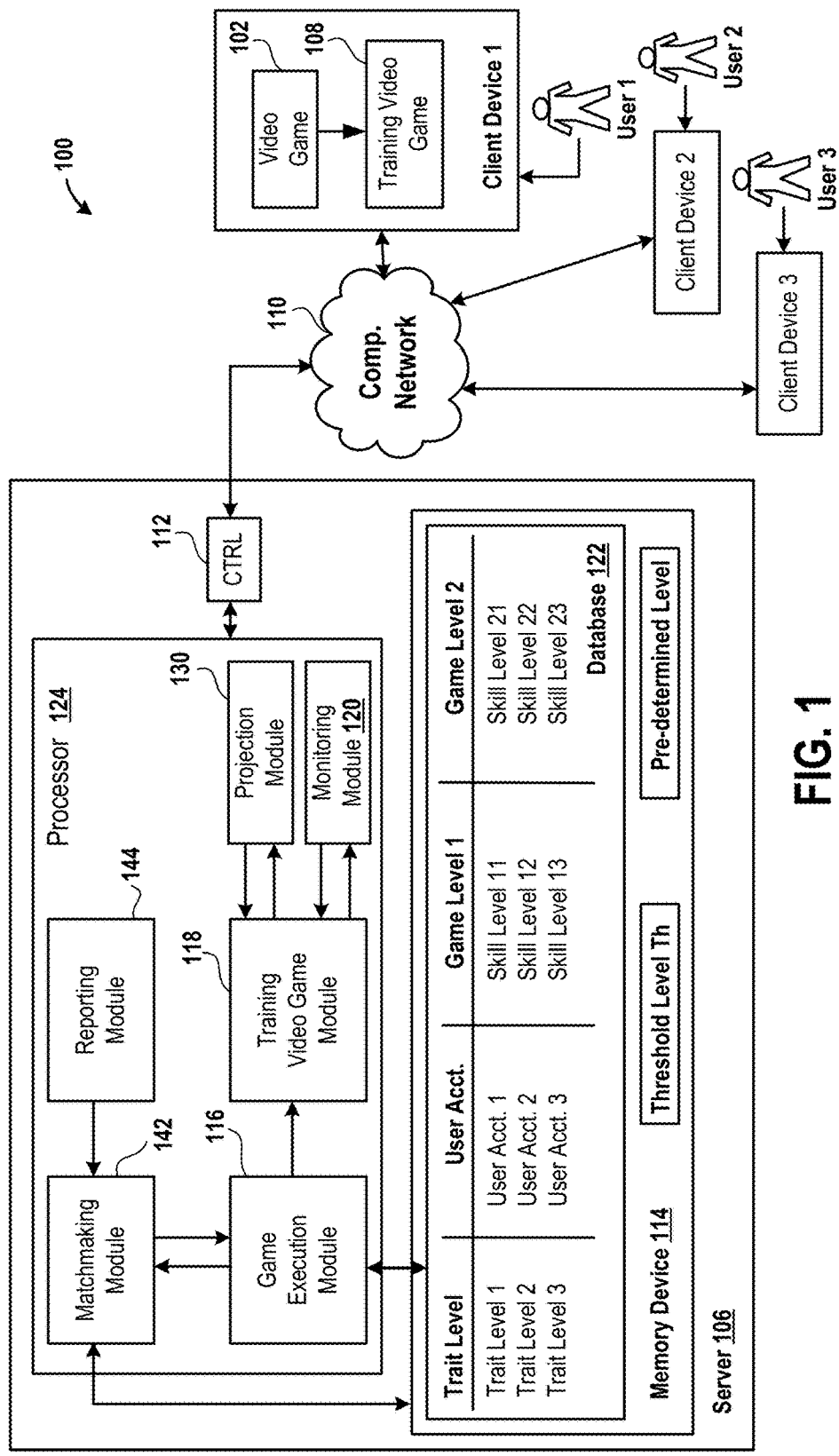
FIG. 1 is diagram of an embodiment of a system for describing a training video game that is executed based on a skill level of a user during a play of a video game.

FIG. 1 is diagram of an embodiment of a system 100 for describing a training video game 108 that is executed based on a skill level of a user 1 during a play of a video game 102. The system 100 includes a server 106, a plurality of client devices 1, 2, and 3. Moreover, the system 100 includes a computer network 110.

In an embodiment, a server is a computer program or a hardware device that provides functionality to other programs or devices such as the client devices 1, 2, and 3. In one embodiment, instead of a server, a virtual machine, which is an emulation of a computer system, is used. In the virtual machine, a hypervisor is a computer software or hardware or a combination thereof that shares and manages hardware resources, such as processors and memory devices, to run a game execution module, a training video game module, a monitoring module, a projection module, a reporting module, and a matchmaking module, which are further described below. As an example, a virtual machine includes an operating system, one or more application computer programs that run on top of the operating system, and one or more hardware resources, e.g., central processing units, graphical processing units, video encoders, audio encoders, network communication devices, memory devices, internal communication devices, network communication devices, etc., that are accessed by the one or more application computer programs via the operating system and the hypervisor for performing the functions described herein as being performed by a server.

A computer network, as used herein, is used to transfer data between a client device and a server or between multiple client devices to facilitate operations of functions described herein as being performed by the server. Examples of the computer network include a wide area network (WAN) such as Internet, or a local area network (LAN) such as an Intranet, or a combination thereof.

A client device, as used herein, is a device that is operated by a user to gain access to a video game that is executed using the server 106. Examples of a client device include a game console, a computer, a smart phone, a smart television, a head-mounted display (HMD), and a tablet, etc. In one embodiment, the video game 102 is executed by the game console or the server 106. In an embodiment, a portion of the video game 102 is executed by the game console and the remaining portion of the video game is executed by the server 106. In one embodiment, a client device includes a hand-held controller that is used by a user to play the video game.

The server 106 includes a processor 124 and a memory device 114 Examples of a processor include a central processing unit (CPU), an application specific integrated circuit (ASIC), and a programmable logic device (PLD).

A memory device is a device from which data is read or to which the data is written. Examples of a memory device include a read-only memory (ROM) device, or a random access memory (RAM) device, or a combination thereof. To illustrate, a memory device includes a flash memory or a redundant array of independent disks (RAID).

The processor 124 is coupled to a network interface controller 112, such as a network interface card (NIC), to enable the processor 124 to communicate via the computer network 110 with one or more of the client devices 1, 2, and 3. For example, the network interface controller 112 applies an external communication protocol, such as a transmission control protocol over Internet protocol (TCP/IP) or a universal datagram protocol over IP (UDP/IP) to generate packets from data that is received from the processor 124 or to depacketize packets received via the computer network 110 to extract data from the packets received.

The processor 124 includes a game execution module 116, a training module 118, a monitoring module 120, a projection module 130, a matchmaking module 142, and a reporting module 144. As used herein, a module is a hardware circuit, such as an ASIC or a PLD, or a computer software program, which is executed by the processor 124, or a combination thereof.

The game execution module 116 executes a computer program to allow the user 1 to play the video game 102. For example, the game execution module 116 determines positions, shapes, and orientations of various virtual objects and a background in a virtual scene of the video game 102. As another example, the game execution module 116 determines parameters, such as intensities, lighting, colors, shading, textures, of the virtual objects and of the background of the video game 102.

The training video game module 118 executes a computer program to allow the user 1 to play the training video game 108. For example, training video game module 118 determines positions, shapes, and orientations of various virtual objects and a background in a virtual scene of the training video game 108. As another example, the training video game module 118 determines the parameters of the virtual objects and of the background of the training video game 108.

In one embodiment, a virtual object within the training video game 108 is one of many virtual objects within the video game 102. For example, when the video game 102 has three virtual targets, one in a left portion, one in a middle portion, and one in a right portion of a display device of the client device, the training video game 108 has the virtual target in the middle portion to train a user to improve his/her shooting accuracy for shooting the middle virtual target. In an embodiment, a virtual scene displayed on the display device, such as a liquid crystal display device or a light emitting diode display device or a plasma display device, of a client device while executing the training video game 108 is a portion of a virtual scene displayed on the display device while executing the video game 102. For example, the virtual scene displayed on the client device during execution of the training video game 108 is at most a portion of the virtual scene displayed while executing the video game 102.

In an embodiment, a virtual object within the training video game 108 is different from all virtual objects within the video game 102. For example, when the video game 102 has three virtual targets, one in the left portion, one in the middle portion, and one in the right portion of the display device of the client device, the training video game 108 has a virtual target in a lower left corner of the display device of the client device to train a user to improve his/her shooting accuracy. In an embodiment, a virtual scene displayed on the display device of the client device while executing the training video game 108 is not a portion of a virtual scene displayed on the display device while executing the video game 102. For example, the virtual scene displayed on the client device during execution of the training video game 108 has a background that is different from a background of the virtual scene displayed during the execution of the video game 102 and all virtual objects within the training video game 108 are different from virtual objects displayed during execution of the video game 102.

The monitoring module 120 determines whether the training video game 108 is successful in helping a user cross a threshold level or a trait level associated with the video game 102. The monitoring module 120 measures a skill level and a trait level of a user during execution of the video game 102 and during execution of the training video game 108.

The reporting module 144 receives comments regarding a characteristic of a user from another user. For example, when the video game 102 is a multiplayer game in which the user 1 is playing with the user 2, the user 2 presses one or more buttons on the input device of the client device 2 to make a selection of a characteristic of the user 1. For example, the user 2 indicates in a comment field associated with the video game 102, such as displayed within the video game 102 or displayed during the execution of the video game 102, the characteristic of the user 1. As another example, in a chat session with the user 1 during a play of the video game 102, the user 2 provides a comment indicating the characteristic of the user 1. Examples of the characteristic of the user 1 include whether the user 1 is helpful, competitive, friendly, rude, casual, toxic, or disruptive during the play of the video game 102. The selection is sent from the network interface controller of the client device 1 via the computer network 110 and the network interface controller 112 to the reporting module 144. The reporting module 144 stores the comment regarding the characteristic within the memory device 114 and associates, such as establishes a one-to-one correspondence with, creates a link between, or creates a mapping between, the comment with a user account 1 of the user 1. Similarly, comments made by other users, such as the user 3, via a user account 3 regarding the characteristic of the user 1 are received by the reporting module 144 and stored in the memory device 114 as being associated with the user account 1. As an example, the reporting module 144 parses the comments made by the users 2 and 3 to determine the characteristic of the user 1. To illustrate, the reporting module determines a number of occurrences of keywords, such as, helpful, or toxic, or disruptive, or friendly, within the comments received from the users 2 and 3 via their corresponding user accounts 2 and 3 to determine the characteristic. If the number of occurrences of the characteristic exceeds a pre-determined number of occurrences, a user profile of the user account 1 assigned to the user 1 is linked to the characteristic.

The memory device 114 includes a database 122 that has entries for user accounts of the users 1, 2, and 3, trait levels associated with the user accounts, and skill levels associated with the user accounts for a particular game level of the video game 102. For example, the user account 1 that is assigned to the user 1 is associated with, e.g., has a correspondence with or a one-to-one relationship with or a link to or a mapping to, a skill level 11 within a game level 1 of the video game 102. Moreover, the user account 1 is associated with, such as has a correspondence with or a one-to-one relationship with or a link to or a mapping to, a skill level 21 of a game level 2 of the video game 102. The game level 2 occurs in time after occurrence of the game level 1 during execution of the video game 102. The game level 2, for example, has more complicated tasks than the game level 1. As an illustration, the game level 2 has a higher number of tasks to fulfill than the game level 1. As another illustration, it is difficult for most of the users 1 through 3 to accomplish the tasks during the game level 2 than those during the game level 1. As another illustration, it is difficult for most of the users 1 through 3 to score more points while performing the tasks during the game level 2 than a number of points accumulated by performing multiple tasks during the game level 1. Similarly, the user account 1 is associated with a trait level 1 of the user 1. In one embodiment, the trait level 1 is a sum of the skill levels 11 and 12, where each skill level 11 and 12 is a number. In an embodiment, the trait level 1 is a weighted sum of the skill levels 11 and 12, where each skill level 11 and 12 is a number.

Similarly, the user account 2 that is assigned to the user 2 is associated with, such as has a correspondence with or a one-to-one relationship with or a link to or a mapping to, a skill level 12 within the game level 1 of the video game 102. Moreover, the user account 2 is associated with, e.g., has a correspondence with or a one-to-one relationship with or a link to or a mapping to, a skill level 22 of the game level 2 of the video game 102. Similarly, the user account 2 is associated with a trait level 2 of the user 2. In one embodiment, the trait level 2 is a sum of the skill levels 12 and 22, where each skill level 12 and 22 is a number. In an embodiment, the trait level 2 is a weighted sum of the skill levels 12 and 22, where each skill level 12 and 22 is a number.

Moreover, the user account 3 that is assigned to the user 3 is associated with, such as has a correspondence with or a one-to-one relationship with or a link to or a mapping to, a skill level 13 within the game level 1 of the video game 102. Moreover, the user account 3 is associated with, e.g., has a correspondence with or a one-to-one relationship with or a link to or a mapping to, a skill level 23 of the game level 2 of the video game 102. Similarly, the user account 3 is associated with a trait level 3 of the user 3. In one embodiment, the trait level 3 is a sum of the skill levels 13 and 23, where each skill level 13 and 23 is a number. In an embodiment, the trait level 3 is a weighted sum of the skill levels 13 and 23, where each skill level 13 and 23 is a number.

A skill level defines a skill of a user as associated with a user account. For example, a skill level defines a shooting accuracy associated with a user account while playing the video game 102, or a reaction rate in reacting to a virtual object that is directed towards a user in the video game 102, or a kill to death (K/D) ratio during the play of the video game 102. The kill to death ratio defines how many kills are made by a virtual user or an avatar of the user during the play of the video game 102 versus how many times the virtual user or the avatar has died during the play of the video game 102. The shooting accuracy, in one embodiment, is measured by how many times the user hits a virtual target in the video game 102 versus how many times the user misses the virtual target. The skill level increases with an increase in the shooting accuracy and decreases with a decrease in the shooting accuracy. The reaction rate, in one embodiment is measured by an amount of time it takes for the user to react to a virtual event, such as a virtual weapon being thrown at a virtual user or an avatar of the user in the video game 102, or a virtual bullet being shot at the virtual user or the avatar in the video game 102. To illustrate, the reaction rate is an amount of time for the virtual user or the avatar of the user to crouch behind a virtual boulder when a virtual zap of lightning is about to strike the virtual user or the avatar. The skill level decreases with an increase in the amount of time taken to crouch and increases with a decrease in the amount of time to crouch. As another example, a skill level is defined by an amount of time taken the user 1 to achieve a goal within a game level of the video game 102. The greater the amount of time taken, the lower the skill level. On the other hand, the lesser the amount of time taken, the higher the skill level.

As another example, a skill level is defined by whether the virtual user or an avatar of the user 1 is helpful to other virtual users, such as ones representing the users 2 and 3, in the video game 102, or is cheerful towards the other virtual users. Moreover, as another example, a skill level is defined by toxicity associated with a user account. For example, a user uses his/her user account to make an R-rated comment during a chat session provided during the execution of the video game 102. The skill level decreases with an increase in an amount of R-rated comments and increases with a decrease in the amount of the R-rated comments. As an example, a skill level is associated with a task. For example, a task in which a virtual user of the video game 102 is sitting down to shoot at a virtual target defines a skill level of shooting the virtual target while sitting down. As another example, a task in which a virtual user of the video game 102 is standing to shoot at a virtual target defines a skill level of shooting the virtual target while standing up. The monitoring module 120 measures the skill levels, such as the shooting accuracy, the reaction rate, an amount of the helpfulness, an amount of the cheerfulness, an amount of R-rated comments, or a combination thereof, associated with the user accounts of the users during a play of the video game 102 and a play of the training video game 108.

In one embodiment, a game level of the video game 102 has different virtual scenes then another game level of the video game 102. For example, the game level 1 has virtual scenes in which a virtual boy saves his virtual brother from falling over a roof of a house. The game level 2 has virtual scenes in which the virtual boy fights a virtual alien. None of the virtual scenes in the game level 2 have the virtual boy saving his virtual brother and none of the virtual scenes in the game level 1 has the virtual boy fighting the virtual alien. In an embodiment, the processor 124 inserts a transition, such as a blank virtual scene, between the virtual scenes of the game level 1 and the virtual scenes of the game level 2.

A user who operates a client device provides login information, such as user name, e-mail address, password, alpha-numeric characters, symbols, or a combination thereof, via an input device, e.g., the hand-held controller, a camera, etc., of the client device to access the user account. When the login information is authenticated by the processor 124, the user is provided access to the user account. Upon determining that the user is authorized to access the user account, the processor 124 allows the client device to access the game execution module 116, the training video game module 118, the monitoring module 120, the projection module 130, and the matchmaking module 142.

It should be noted that the login information is associated with, e.g., is unique to, a user account. For example, the login information that is used to access the user account 1 is different than login information that is used to access the user account 2 and is different from login information that is used to access the user account 3. As another example, when the processor 124 determines that login information is allocated to the user account 1, the processor 124 determines not to allocate the same login information to the user account 2. When login information is associated with a user account, the user account is assigned to a user.

Figure 2:
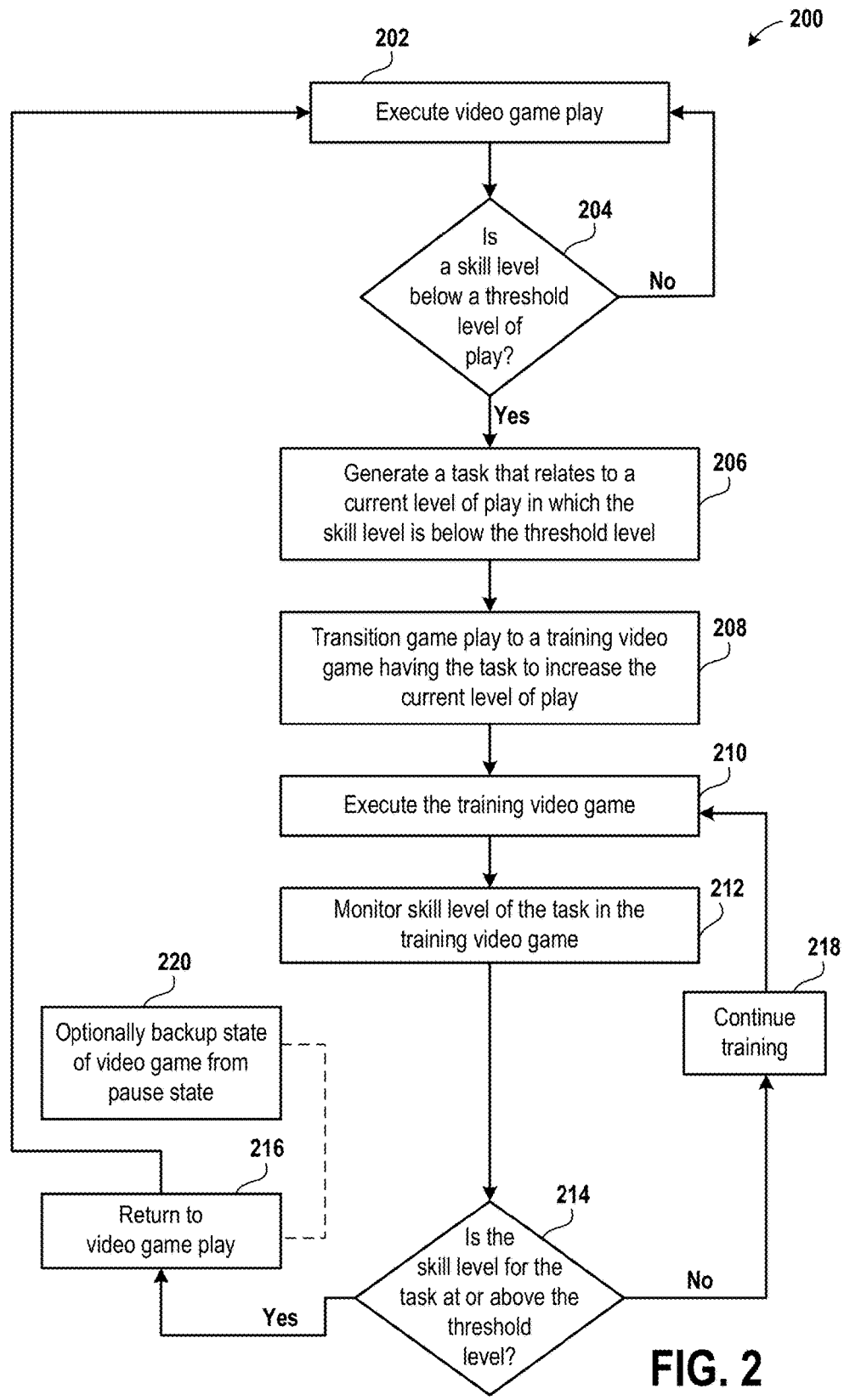
FIG. 2 is a flowchart of an embodiment of a method to illustrate execution of the training video game based on a skill level of the user during a play of the video game.

FIG. 2 is a flowchart of an embodiment of a method 200 to illustrate execution of the training video game 108 based on a skill level of the user 1 during a play of the video game 102. The method 200 is executed by the processor 124, or by the game console, or by a combination of the processor 124 and the game console. The method includes a plurality of operations 202, 204, 206, 208, 210, 212, 214, 216, and 218.

The processor 124 executes, in the operation 202, video game play of the video game 102. For example, upon authenticating the user account 1, the game execution module 116 of FIG. 1 is executed to generate a virtual scene of the video game 102. Data for the virtual scene is packetized by the network interface controller 112 and sent via the computer network 110 to the client device 1 of FIG. 1. A network interface controller of the client device 1 applies the external communication protocol to depacketize the packets to extract the data for the virtual scene. A processor of the client device 1 displays the virtual scene on the display device of the client device 1 to display the video game 102.

The processor 124, in the operation 204, determines whether a skill level associated with the user account 1, during execution of the video game 102 is below the threshold level of play. For example, the processor 124 determines whether the skill level 12 during the game level 2 of the video game 102 is below the threshold level. To illustrate, the monitoring module 120 is executed to determine whether the shooting accuracy is less than 7/10, wherein 7 represents the number of times a virtual target of the video game is hit by the user 1 during the play of the video game 102 and 10 represents a maximum number of times the virtual target can be hit by the user 1 during the play of the video game 102. As another illustration, the monitoring module 120 is executed to determine whether the shooting accuracy is less than 7/10, wherein 7 represents the number of times a virtual target of the video game is hit by a virtual user of the video game 102. The virtual user is in a particular position, such as a standing position or a sitting position. Also, in this example, ten represents a maximum number of times the virtual target can be hit by the virtual user during the play of the video game 102. As another example, the monitoring module 120 is executed to determine whether the reaction rate in reacting to a blow from a virtual opponent in the video game 102 is greater than a pre-set amount of time. As another illustration, the monitoring module 120 is executed to determine whether a combination of two or more of the shooting accuracy, the reaction rate, the amount of helpfulness, the amount of cheerfulness, and a number of the R-rated comments is less than the threshold level.

Upon determining that the skill level is not below the threshold level, the operation 202 continues. On the other hand, upon determining that the skill level is below the threshold level, the processor 124 generates, in the operation 206, a task that relates to a current level of play by the user 1 via the user account 1 of the video game 102. The current level of play is defined by the skill level that is determined to be below the threshold level. As an example of the operation 206, the training video game module 118 of FIG. 1 is executed to generate one or more virtual objects and/or a background that will increase the skill level of the user 1. To illustrate, the training video game module 118 generates a virtual target to display in the middle portion of the display screen of the client device 1 when the monitoring module 120 determines that the user 1 has the shooting accuracy of less than 7/10 in shooting the virtual target in the middle portion. In addition, the training video game module 118 generates a virtual gun for shooting the virtual target. The virtual gun and the virtual target facilitate a task of shooting the virtual target. As another illustration, the training video game module 118 generates a virtual scene in which a virtual user can help other virtual users in collecting virtual objects or in finding a virtual path to a virtual goal when the monitoring module determines that the user 1 has the amount of helpfulness below a specific level, which is an example of the threshold level. The virtual scene includes multiple virtual users that represent other users, such as the user 2 and the user 3 and the virtual objects to be collected.

The processor 124, in the operation 208, transitions the video game 102 to the training video game 108 having the task to increase the current level of play. For example, instead of executing the game execution module 116 of FIG. 1, the training video game module 118 of FIG. 1 is executed to transition the video game 102 to the training video game 108. To illustrate, the game execution module 116 pauses the execution of the video game 102 and sends a signal to the training video game module 118 to execute the training video game 108. To pause the video game 102, the game execution module 116 stores a game state of virtual objects and a background of a virtual scene of the video game 102 at a time the video game 102 is paused. The game state is stored in the memory device 114. Examples of the game state include sizes, shapes, positions and orientations of the virtual objects, a size, a shape, a position and orientation of the background, and other variables, such as, a color, a texture, a shading, a lighting intensity of the virtual objects and the background. Moreover, the game execution module 116 sends variables, such as the skill level 21, which is below the threshold level. Other examples of the variables include one or more virtual objects of the video game 102 used to increase the skill level 21 to be above the threshold level, background of the virtual objects, or a combination thereof. The training video game module 118 creates a virtual scene having the one or more virtual objects that are received from the game execution module 116. The training video game module 118 superimposes the one or more virtual objects against the background that is received from the game execution module 116. In one embodiment, the training video game module 118 applies a background other than the one received from the game execution module 116. In one embodiment, during the transition from the video game 102 to the training video game 108, the processor 124 generates a blank virtual scene to indicate the transition. The blank virtual scene is sent via the computer network 110 to the client device 1 for display.

In one embodiment, in the operation 208, the processor 124, such as the monitoring module 120, generates a prompt that requests the user 1 via the user account 1 whether the user 1 wishes to stop playing the video game 102 and transition to the training video game 102. The prompt is sent from the monitoring module 120 via the computer network 110 to the client device 1. The user 1 selects a button on the input device of the client device 1 or makes a gesture to indicate a response of the user 1 via the user account 1. The response is sent from the network interface controller of the client device 1 via the computer network 110 to the network interface controller 112 of the server 106. Upon receiving the response indicating that the user 1 wishes to transition to the training video game 108, the monitoring module 120 sends a signal to the training video game module 118 to execute the training video game 108.

The processor 124, in the operation 210, executes the training video game 108. For example, the training video game module 118 sends the one or more virtual objects and/or a background to the network interface controller 112, which packetizes the one or more virtual objects and/or the background and sends the packets via the computer network 110 to the client device 1. The network interface controller of the client device 1 extracts the one or more virtual objects and/or the background from the packets and displays the one or more virtual objects and/or the background within the training video game 108. The one or more virtual objects are used by the training video game module 118 to apply the task for which the skill level 21 is below the threshold level to increase the skill level 21 to be above the threshold level. For example, the virtual target in the middle portion of the display screen of the client device 1 increases the skill level 21 by allowing the user 1 to practice the task of shooting. As another example, the virtual boulder behind which a virtual user or an avatar that represents the user 1 in the video game 102 crouches, facilitates to increase the reaction rate of the user 1 when the virtual weapon is being thrown at the virtual user or the avatar.

The processor 124, in the operation 212, monitors the skill level 21 for the task in the training video game 108. For example, the monitoring module 120 of FIG. 1 during the execution of the training video game 108, measures a skill level associated with the user account 1 assigned to the user 1. To illustrate, the monitoring module 120 determines the shooting accuracy of the user 1 from a number of times the virtual target in the middle portion of the display device of the client device 1 is hit by a virtual bullet. As another illustration, the monitoring module 120 calculates the reaction rate, such as an average reaction time, of the user 1 from an amount of time between a release of a virtual weapon by a virtual user within the training video game 108 and an initiation of a virtual user or an avatar representing the user 1 to crouch to avoid being hit by the virtual weapon. The average reaction time is calculated over multiple times over which the virtual user is attacked by the virtual weapon. As yet another illustration, the monitoring module counts a number of times a virtual user or an avatar representing the user 1 within the training video game 108 helps other virtual users by providing them with a virtual object that is requested by the other virtual users. As another illustration, a monitoring module counts a number of R-rated comments made by the user 1 during the training video game 108.

The processor 124, in the operation 214, determines whether the skill level that is monitored in the operation 212 is at or above the threshold level. For example, the monitoring module 120 determines whether the skill level 21 is increased to an amount that is above the threshold level. To illustrate, the monitoring module 120 determines whether a number of times the virtual target in the middle portion of the display screen of the client device 1 is hit by a virtual bullet each time is greater than 7 when the user account 1 is provided with 10 virtual bullets. As another illustration, the monitoring module 120 determines whether an average amount of time taken between a release of the virtual weapon within the training video game 108 and initiation of crouching by a virtual user or an avatar representing the user 1 within the training video game 108 is less than 1 second or a specific fraction of a second. The average amount of time is measured over a pre-determined number of times for which the virtual weapon is released.

Upon determining that the skill level that is monitored in the operation 212 is above the threshold level, the processor 124, in the operation 216 returns to execute the video game 102. For example, the training video game module 118 discontinues execution of the training video game 108 and sends a signal to the game execution module 116 to execute the video game 102. The game execution module 116 upon receiving the signal continues execution of the video game 102. The game execution module 116 continues the execution at a point in time at which the video game 102 was paused execution to perform the transition, in the operation 208, to the training video game 108. To illustrate, when the user 1 has accumulated 6 points out of 10 in the video game 102 during the execution in the operation 202, the game execution module 116 continues to execute the video game 102 with the sixth point in the video game 102. Moreover, the same virtual scene in which the user has accumulated the six points is created to continue the execution of the video game 102. As another illustration, the game state at which the video game 102 is paused is fetched from the memory device 114 by the game execution module 116 and execution of the video game 102 continues from the game state.

In an embodiment, instead of performing the operation 216 of returning to execute the video game 102, the processor 124 performs an operation 220 of returning to execute the video game 102 before a time at which the video game 102 was paused during the execution of the video game 102 in the operation 202. As an example, the game execution module 116 continues the execution before the point in time at which the video game 102 was paused execution to perform the transition, in the operation 208, to the training video game 108. As an illustration, when the user 1 has accumulated 6 points out of 10 in the video game 102 during the execution in the operation 202, the game execution module 116 continues to execute the video game 102 with a virtual scene that was displayed a pre-determined number of seconds before a virtual scene in which the user accumulated the sixth point was displayed. As another illustration, when the user 1 finished making a comment during the execution of the video game 102 in the operation 202, the game execution module 116 continues to execute the video game 102 at a point at which the user 1 is allowed to start making the comment. As another illustration, the game execution module 116 fetches a prior game state of the video game 102 before the game state at which the video game 102 is paused and continues execution from the prior game state. An example of the prior game state is a virtual scene that is before a virtual scene at which the video game 102 is paused. Another example of the prior game state is a state having a first position of a virtual object that is different from a second position of the virtual object, and the first position occurs in time before the second position occurs. The first position is different than the second position. Another example of the prior game state is a state having a first orientation of a virtual object that is different from a second orientation of the virtual object, and the first orientation occurs in time before the second orientation occurs. The first orientation is different than the second orientation.

In the operation 214, on the other hand, upon determining that the skill level for the task in the training video game 108 is below the threshold level, the processor 124 performs an operation 218 to continue the execution of the training video game 108. For example, the training video game module 118 continues the execution of the training video game 108 by increasing an intensity level of a task associated with the skill level 12 that is below the threshold level Th.

In one embodiment, in the operation 216, the processor 124, such as the monitoring module 120, generates a prompt that requests the user 1 via the user account 1 whether the user 1 wishes to stop playing the training video game 108 and transition to the video game 102. The prompt is sent from the monitoring module 120 via the computer network 110 to the client device 1. The user 1 selects a button on an input device or makes a gesture to indicate a response of the user 1 via the user account 1. The response is sent from the network interface controller of the client device 1 via the computer network 110 to the network interface controller 112 of the server 106. Upon receiving the response indicating that the user 1 wishes to transition to the video game 102, the monitoring module 120 sends a signal to the game execution module 116 to execute the video game 102.

In an embodiment, during the transition from the training video game 108 to the video game 102, the processor 124 generates a blank virtual scene to indicate the transition. The blank virtual scene is sent via the computer network 110 to the client device 1 for display.

In one embodiment, the user 1 does not need to log out of the user account 1 between the execution of the video game in the operation 202 and the execution of the training video game 108 in the operation 210. For example, the user 1 does not select a logout button that is displayed on the display device of the client device 1 to log out of the user account 1. When the user 1 logs out of the user account 1, the user 1 cannot access the video game 102 and the training video game 108. Similarly, the user 1 does not need to log out of the user account 1 between the execution of the training video game 108 in the operation 210 and the execution of the video game in the operation 202 after returning in the operation 216 to the play of the video game 102.

In an embodiment, once the user 1 achieves a pre-determined skill level, e.g., the skill level above the threshold level th, the user 1 is matched with the other user 2, which also has the pre-determined skill level. The user 1 achieves the pre-determined skill level during the execution of the video game 202 or the execution of the training video game 108. For example, when the processor 124 receives a request to play the video game 102 from the input device of the client device 1, the user account 1, the network interface controller of the client device 1, the computer network 110, and the network interface controller 112, the matchmaking module 142 of FIG. 1 identifies, from an association between the user account 1 and the skill level 11, that the user 1 has the skill level 11. Similarly, when the processor 124 receives a request to play the video game 102 from the input device of the client device 2, the user account 2, a network interface controller of the client device 2, the computer network 110, and the network interface controller 112, the matchmaking module 142 identifies, from an association between the user account 2 and the skill level 12, that the user 2 has the skill level 12. The matchmaking module 142 further determines that the skill level 11 matches the skill level 12 and that both the skill levels are above the threshold level th. The video game 102, in this embodiment, is a multi-player game. Upon determining that the skill level 11 matches the skill level 12 and that both the skill levels are above the threshold level th, the matchmaking module 142 indicates to the game execution module 116 to match the user account 1 with the user account 2 during the play of the video game 102. The game execution module 116 executes the video game 102 to allow the user 1 to control via the user account 1 one or more virtual objects, such as virtual players or the virtual gun, of the video game 102 and further executes the video game 102 to allow the user 2 to control via the user account 2 to control one or more of the remaining virtual objects of the video game 102.

Figure 3:
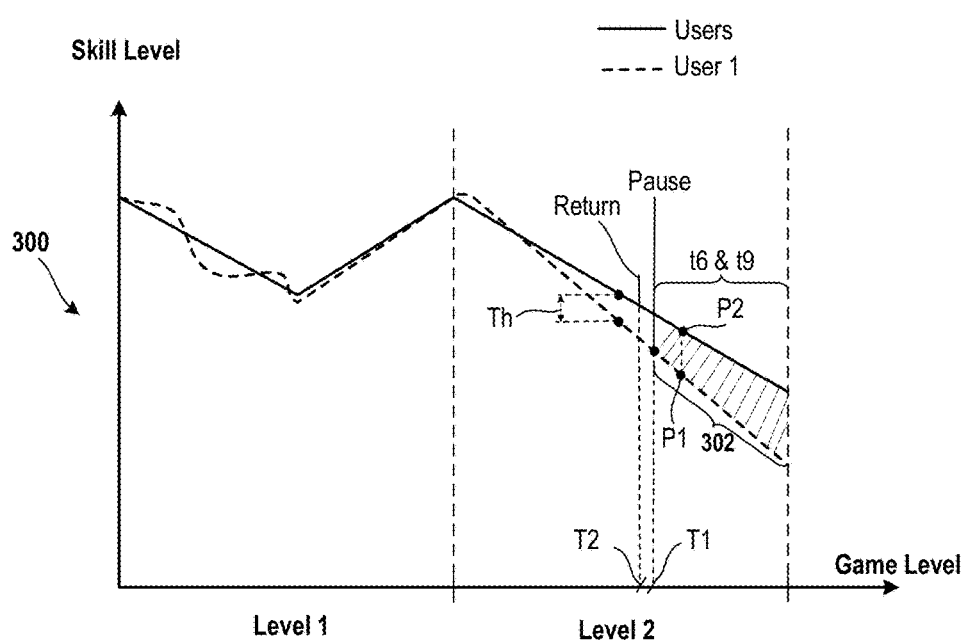
FIG. 3 is an embodiment of a graph to illustrate a comparison between a skill level associated with a user account of the user and a statistical value of skill levels associated with the user accounts of other users.

FIG. 3 is an embodiment of a graph 300 to illustrate a comparison between a skill level associated with the user account 1 of the user 1 and a statistical value of skill levels associated with the user accounts of other users, such as the users 2 and 3. Examples of the statistical value include an average value or a median value. The graph 300 plots skill level of the users versus game levels of the video game 102.

As shown in the graph 300, during the game level 1, the skill level of the user 1 is close to the statistical value of the skill levels of the other users. For example, a difference between the skill level 11 and a statistical value of the skill levels 12 and 13 is less than the threshold level during the game level 1. Each of the skill levels 11, 12, and 13 is for the same task, such as shooting the virtual target in the middle portion, shooting the virtual target in the middle portion while a virtual user that shoots the virtual target sits down, or crouching by a virtual user behind the virtual boulder, or helping a number of virtual users, or cheering for a number of virtual users. Accordingly, when the difference between the skill level 11 and the statistical value of the skill levels 12 and 13 is less than the threshold level, during the execution of the video game in the operation 202, there is no triggering of the execution of the training video game 108.

However, during the game level 2 of the execution of the video game 102, at a time T1, the difference between the skill level associated with the user account 1 of the user 1 and the statistical value of the skill levels associated with the user accounts of the other users is greater than the threshold level Th. When the monitoring module 120 determines that the difference between the skill level associated with the user account 1 of the user 1 and the statistical value of the skill levels associated with the user accounts of the other users is greater than the threshold level Th, the monitoring module 120 sends a signal to the game execution module 116 to pause the execution of the video game 102 and sends a signal to the training video game module 118 to start the execution of the training video game 108.

In one embodiment, in addition to or instead of determining that the difference between the skill level associated with the user account 1 of the user 1 and the statistical value of the skill levels associated with the user accounts of the other users is greater than the threshold level Th, the monitoring module 120 sends a signal to the projection module 130 of FIG. 1 to determine whether a projection, such as a line or a curve, of skill levels associated with the user account 1 will continue to be below the threshold level th. For example, the projection module 130 upon receiving the signal from the monitoring module 120 projects the skill level 21 through tasks remaining to be performed during the game level 2 by the user 1 after the time T1 to generate a projection 302. The projection module 130 determines that a difference between each point, such as a point P1, on the projection 302 and the corresponding point, such as a point P2, on the statistical values of skill levels of the other users will increase with a passage of time to be greater than the threshold level Th. Both the points P1 and P2 represent skill levels during the same game level 2 for the same task. Upon determining that the difference will increase with time during the game level 2, the prediction module 130 sends a signal to the training video game module 118 of FIG. 1 to execute the training video game 108.

A time T2 illustrated in the graph 300 illustrates a point in time before the time T1 at which the execution of the video game 102 is paused to transition from the video game 102 to the training video game 108. When the skill level of the user 1 is determined by the monitoring module 120 to be above the threshold level Th1, the execution of the video game returns in the operation 216 of FIG. 2 to the time T2 before the time T1. In an embodiment, when the skill level of the user 1 is determined by the monitoring module 120 to be above the threshold level Th1, the execution of the video game returns in the operation 216 of FIG. 2 to the time T1.

In one embodiment, upon determining that the difference between each point on the projection 302 and the corresponding point on the statistical values of skill levels of the other users will decrease with time during the game level 2, the projection module 130 sends a signal to the training video game module 118 to request the training video game module 118 to inquire the game execution module 116 about projection tasks to be performed during the game level 2 after the time T1. The projection tasks are tasks in addition to a task, such as a task t3, determined by the monitoring module 118 to be performed to increase the skill level 21. When the projection tasks are determined, the video game 102 is not executed to a point in time after the time T1. When the projection tasks are determined, the user 1 has not played the video game 102 to the point in time at which the projection tasks are performed during the play of the video game 102. Upon receiving a signal to inquire about the projection tasks from the projection module 130, the training video game module 118 requests from the game execution module 116, virtual objects and/or backgrounds to perform the projection tasks. The training video game module 118 sends a signal to the game execution module 116 to receive the virtual objects and/or backgrounds to perform the projection tasks to generate a virtual scene including the virtual objects and/or backgrounds for the training video game 108 to perform the projection tasks.

Figure 4:
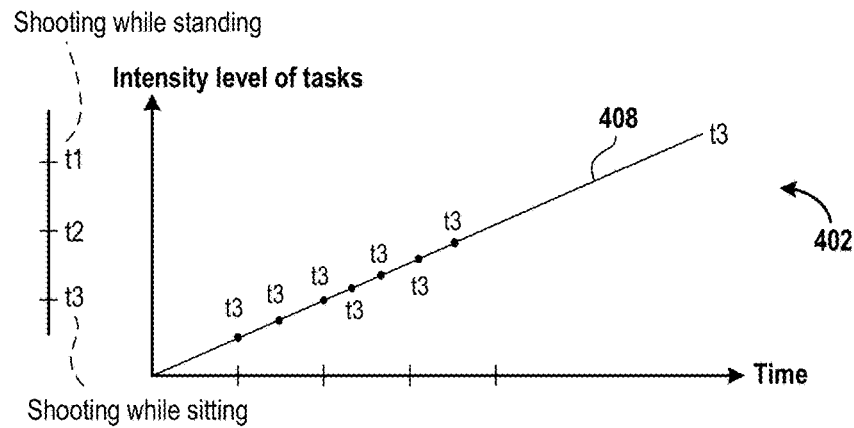
FIG. 4 is a diagram to illustrate multiple graphs to illustrate various tasks that are generated during the execution of the training video game.
Figure 4:
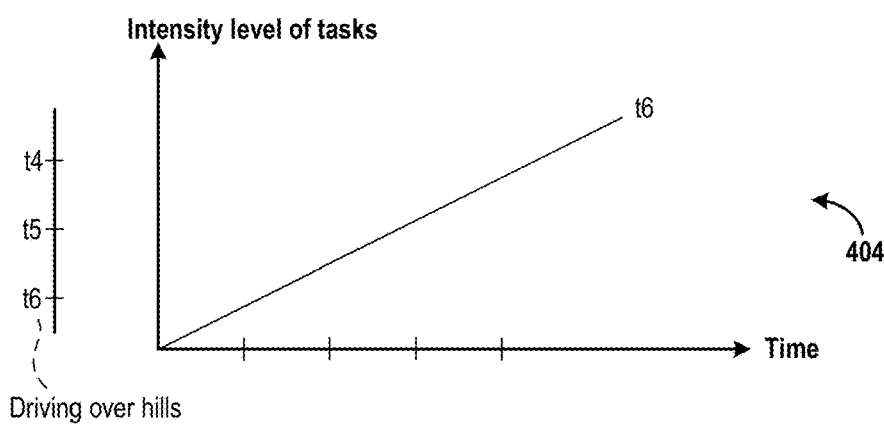
Figure 4:
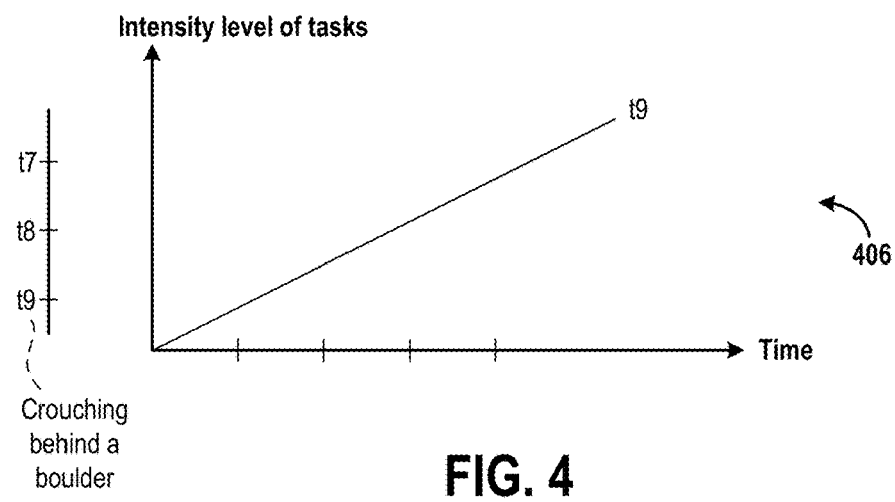

FIG. 4 is a diagram to illustrate multiple graphs 402, 404 and 406 to illustrate various tasks, such as t1, t2, t3, t4, t5, t6, 7, t8, and t9 that are generated during the execution of the training video game 108. The graph 402 plots an intensity with which the task t3 is displayed during the execution of the training video game 108 versus time t of execution of the training video game 108. For example, as the training video game 108 progresses, a frequency with which the task t3 of shooting a virtual target while a virtual user or an avatar representing the user 1 is sitting, is increased. As another example, a frequency with which a virtual target is knocked down when a virtual bullet hits the virtual target and comes back up during the training video game 108 is increased with the progression of the training video game 108. Similarly, the graph 404 plots an intensity with which the task t6 is displayed during the execution of the training video game 108 versus time t of execution of the training video game 108. Moreover, the graph 406 plots an intensity with which the task t9 is displayed during the execution of the training video game 108 versus time t of execution of the training video game 108.

Figure 5:
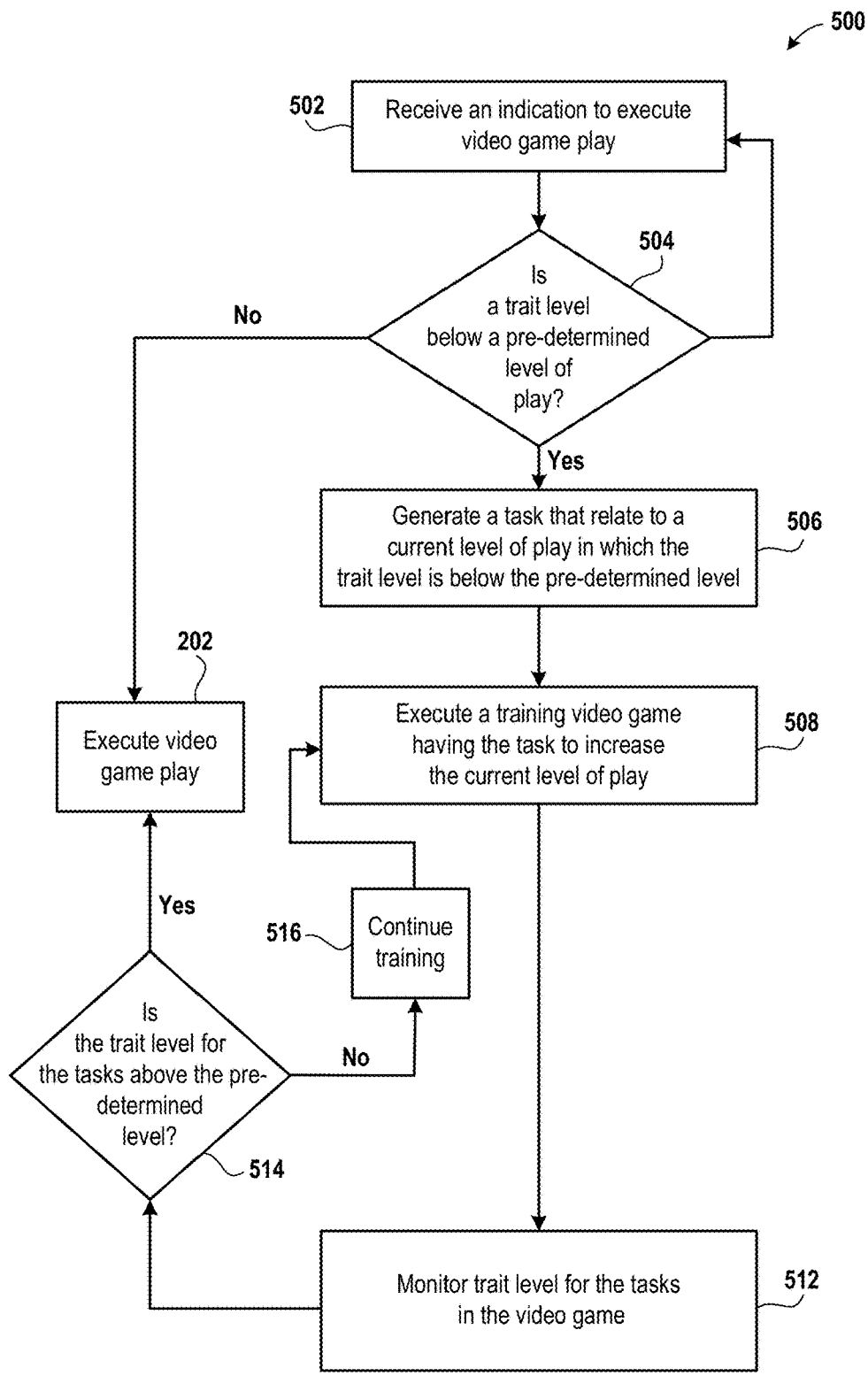
FIG. 5 is a flowchart of an embodiment of a method for illustrating execution of the training video game based on a trait level associated with the user account of the user.

FIG. 5 is a flowchart of an embodiment of a method 500 for illustrating execution of the training video game 108 based on a trait level associated with the user account 1 of the user 1. The method 500 includes multiple operations 502, 504, 506, 508, 512, 514, 516, and 202. The method 500 is executed by the processor 124, or by the game console, or by a combination of the processor 124 and the game console.

In the operation 502, the processor 124 receives an indication of execution of the video game 102. For example, the user 1, after logging into the user account 1, selects on the input device, such as a hand-held controller, of the client device 1, one or more buttons to indicate a selection of the video game 102. As another example, the user 1, after logging into the user account 1, makes a gesture, which is captured by a camera of the client device 1 as image data. The image data or the selection is sent from the network interface controller of the client device one via the computer network 110 to the network interface controller 112 of the server 106.

Upon receiving the image data or the selection, the processor 124 of the server 106 of FIG. 1 determines, in the operation 504, whether a trait level associated with the user account 1 is below a pre-determined level of play. For example, the monitoring module 120 of FIG. 1 determines whether the trait level 1 associated with a play of the video game 102 is less than the pre-determined level of play. The monitoring module 120 determines the trait level 1 based on a prior game play of the video game 102 via the user account 1 by the user 1. The prior game play is a play of the video game 102 via the user account 1 before the indication to execute the video game 102 is received in the operation 502. For example, the monitoring module 120 determines whether a weighted combination of the skill levels l1 and l2 monitored during the prior game play is less than the pre-determined level of play. An example of the prior game play is one in which the video game 102 is executed before the indication of execution of the video game is received in the operation 502. To illustrate, the prior game play occurs during a prior gaming session of the video game 102. As another illustration, the prior game play occurs before the user 1 logs out of the user account. The user 1 then logs back into the user account 1 to provide the selection, which is received as an indication for execution of the video game 102 in the operation 502.

Upon determining that the trait level 1 is not below the pre-determined level of play, the operation 202 of execution of the video game 102 is performed. On the other hand, upon determining that the trait level 1 is below the pre-determined level of play, the monitoring module 120 sends a signal to the training video game module 118 to generate tasks. Upon receiving the signal from the monitoring module 120, the training video game module 118 generates, in the operation 506, the tasks, such as t1 and t2 through t9, that are to be applied in the video game 102. The tasks are to be applied in the video game 102 to increase the trait level 1 to be above the pre-determined level of play. To illustrate, virtual objects from different game levels of the video game 1 are identified by the training video game module 118 by requesting the game execution module 116 for the virtual objects and/or background to accomplish the tasks such as t1 and t2 through t9. To further illustrate, the virtual targets that are displayed in the middle and left portions of the display screen of the client device 1 are identified by inquiring the game execution module 116 to improve the task t1 of shooting while standing and the task t3 of shooting while sitting. The standing and the sitting are performed by a virtual user or an avatar representing the user 1 within the video game 102. It should be noted that data regarding all virtual objects and backgrounds of different virtual scenes of the video game 102 are stored in the memory device 114. As another illustration, the virtual boulder behind which a virtual user or an avatar representing the user 1 crouches to avoid being hit by the virtual weapon is identified by the game execution module 116 upon receiving a request from the training video game module 118. The request includes the task t9 of crouching behind the virtual boulder. It should be noted that the task t2 is not needed to increase the trait level 1 to be above the pre-determined level of play. Therefore, the training video game module 118 does not request the game execution module 116 to identify virtual objects and/or background within the video game 102 for accomplishing the task t2.

In the operation 508, the processor 124 executes the training video game 108 having the tasks t1 and t3 through t9 to increase a current level of play of the user 1 to increase the trait level 1. For example, the training video game module 118 generates a virtual scene having the virtual targets in the middle and left portions of the display device of the client device 1, and sends the virtual scene via the network interface controller 112, the computer network 110 and the network interface controller of the client device 1 to display the virtual scene on the display device of the client device 1 to improve the shooting accuracy of the user 1 for a game level of the video game 102. As another example, the training video game module generates a virtual scene having the virtual boulder behind which a virtual user or an avatar representing the user 1 can crouch to improve the reaction rate of the user 1 for a game level of the video game 102. As yet another example, a virtual scene in which a virtual user or an avatar representing the user 1 can help other virtual users to collect virtual goods or virtual points is generated within the training video game 108. It should be noted that the processor 124 does not execute the video game 102 upon determining that the trait level 1 is below the pre-determined level of play in the operation 504. Rather, the processor 124, instead of executing the video game 102, executes the training video game 108.

In the operation 512, the processor 124 monitors whether the trait level 1 for the tasks t1 and t3 through t9 in the training video game 108 has increased. For example, the monitoring module 120 determines whether a weighted combination of skill levels for performing the tasks t1 and t3 through t9 has increased or decreased since the weighted combination was measured in the operation 504. To illustrate, the monitoring module 120 calculates a first sum of a number of virtual bullets hitting the virtual target in the middle portion of the display device of the client device 1 and a number of virtual bullets hitting the virtual target in the left portion of the display device. As another illustration, the monitoring module 120 calculates a second sum of a number of virtual bullets hitting the virtual target in the middle portion of the display device of the client device 1, a number of virtual bullets hitting the virtual target in the left portion of the display device, and a number of times for which a virtual user or avatar representing the user 1 crouches behind the virtual boulder in less than a pre-determined amount of time.

In the operation 514, the processor 124 determines whether the trait level 1 has increased to being above the pre-determined level of play. For example, the monitoring module 120 calculates whether the first sum determined in the operation 512 is greater than the pre-determined level of play, which is a number. To illustrate, the monitoring module 120 determines whether the first sum is greater than a sum determined during the operation 504. The sum determined during the operation 504 is a sum of a number of virtual bullets hitting the virtual target in the middle portion of the display device of the client device 1 and a number of virtual bullets hitting the virtual target in the left portion of the display device. As another example the monitoring module 120 calculates whether the second sum determined in the operation 512 is greater than the pre-determined level of play. To illustrate, the monitoring module 120 determines whether the second sum is greater than a sum determined during the operation 504. The sum determined during the operation 504 is a sum of a number of virtual bullets hitting the virtual target in the middle portion of the display device of the client device 1, a number of virtual bullets hitting the virtual target in the left portion of the display device, and a number of times for which a virtual user or avatar representing the user 1 crouches behind the virtual boulder in less than a pre-determined amount of time.

Upon determining that the trait level 1 has increased to being above the pre-determined level of play, the processor 124 performs the operation 202 of execution of the video game 102. For example, the training video game module 118 sends a signal to the game execution module 116 to initiate execution of the video game 102. In an embodiment, the processor 124 inserts a transition, such as a blank virtual scene, between a virtual scene of the training video game 108 and a virtual scene of the video game 102 before performing the operation 202 of execution of the video game 102.

On the other hand, upon determining that the trait level 1 has not increased to being above the pre-determined level of play, the processor performs the operation 516 of continuing to execute the training video game 108. For example, the training video game module 118 continues the execution of the training video game 108 in the operation 508. To illustrate, the training video game module 118 continues the execution of the training video game 108 by increasing an intensity level of the tasks associated with the trait level 1 that is below the pre-determined level of play.

In one embodiment, the method 500 is performed during execution of the video game 102 instead of before the execution of the video game 102. For example, the operation 202 of execution of the video game 102 is performed before the operation 504 of determining whether the trait level 1 is below the pre-determined level of play. There is a transition, such as a blank virtual scene, between the execution of the video game 102 and execution, in the operation 508, of the training video game 108.

In an embodiment, once the user 1 achieves a pre-determined trait level, e.g., the trait level above the pre-determined level of play, either before the execution of the video game 102 or during the execution of the video game 102, the user 1 is matched with the other user 2, which also has the pre-determined trait level. For example, when the processor 124 receives a request to play the video game 102 from the input device of the client device 1, the user account 1, the network interface controller of the client device 1, the computer network 110, and the network interface controller 112, the matchmaking module 142 of FIG. 1 identifies, from an association between the user account 1 and the trait level 1, that the user 1 has the trait level 1. Similarly, when the processor 124 receives a request to play the video game 102 from the input device of the client device 2, the user account 2, the network interface controller of the client device 2, the computer network 110, and the network interface controller 112, the matchmaking module 142 identifies, from an association between the user account 2 and the trait level 2, that the user 2 has the trait level 2. The matchmaking module 142 further determines that the trait level 1 matches the trait level 2 and that both the trait levels are above the pre-determined level of play. The video game 102, in this embodiment, is a multi-player game. Upon determining that the trait level 1 matches the trait level 2 and that both the trait levels are above the pre-determined level of play, the matchmaking module 142 indicates to the game execution module 116 to match the user account 1 with the user account 2 during the play of the video game 102. The game execution module 116 executes the video game 102 to allow the user 1 to control via the user account 1 one or more virtual objects of the video game 102 and further executes the video game 102 to allow the user 2 to control via the user account 2 to control one or more of the remaining virtual objects of the video game 102.

In an embodiment, instead of or in addition to applying the skill levels and the trait levels associated with the user accounts 1 and 2 of the users 1 and 2, the matchmaking module 142 determines from similarity between characteristics associated with the user accounts 1 and 2 whether the user 1 is to be matched with the other user 2 during the execution of the video game 102. For example, when both the user accounts 1 and 2 are associated with positive characteristics, the matchmaking module 142 determines to match the user account 1 with the user account 2 for executing the video game 102. Illustrations of the positive characteristics include being helpful, being cheerful, and being friendly. When the user accounts 1 and 2 are matched, during the execution of the video game 102, the user 1 via the user account 1 is allowed by the game execution module 116 to control one or more virtual objects within the video game 102 and the user 2 via the user account 2 is allowed by the game execution module 116 to control remaining virtual objects within the video game 102. To illustrate, the user 1 via the user account 1 is allowed to control virtual players of a virtual soccer team in the video game 102 and the user 2 via the user account 2 is allowed to control virtual players of an opposite virtual soccer team in the video game 102. As another example, when both the user accounts 1 and 2 are associated with negative characteristics, the matchmaking module 142 determines to match the user account 1 with the user account 2 for executing the video game 102. Illustrations of the negative characteristics include being rude and being toxic. As another example, when the user account 1 is associated with the positive characteristic and the user account 2 is associated with the negative characteristic, the matchmaking module 142 determines not to match the user account 1 with the user account 2 for executing the video game 102. As another example, when the user account 1 is associated with the competitive characteristic and the user account 2 is associated with the competitive characteristic, the matchmaking module 142 determines to match the user account 1 with the user account 2 for executing the video game 102. As yet another example, when the user account 1 is associated with the casual characteristic and the user account 2 is associated with the casual characteristic, the matchmaking module 142 determines to match the user account 1 with the user account 2 for executing the video game 102.

In one embodiment, the user 1 does not need to log out of the user account 1 between the execution of the training video game 108 in the operation 508 and the execution of the video game in the operation 202.

In an embodiment, in which the game console executes one or more portions of the game execution module 116, one or more portions the training video game module 118, one or more portions of the monitoring module 120, one or more portions of the projection module 130, and/or one or more portions of the matchmaking module 142, the virtual objects and the background of the different virtual scenes of the video game 102 are stored in a memory device within the game console.

Figure 6A:
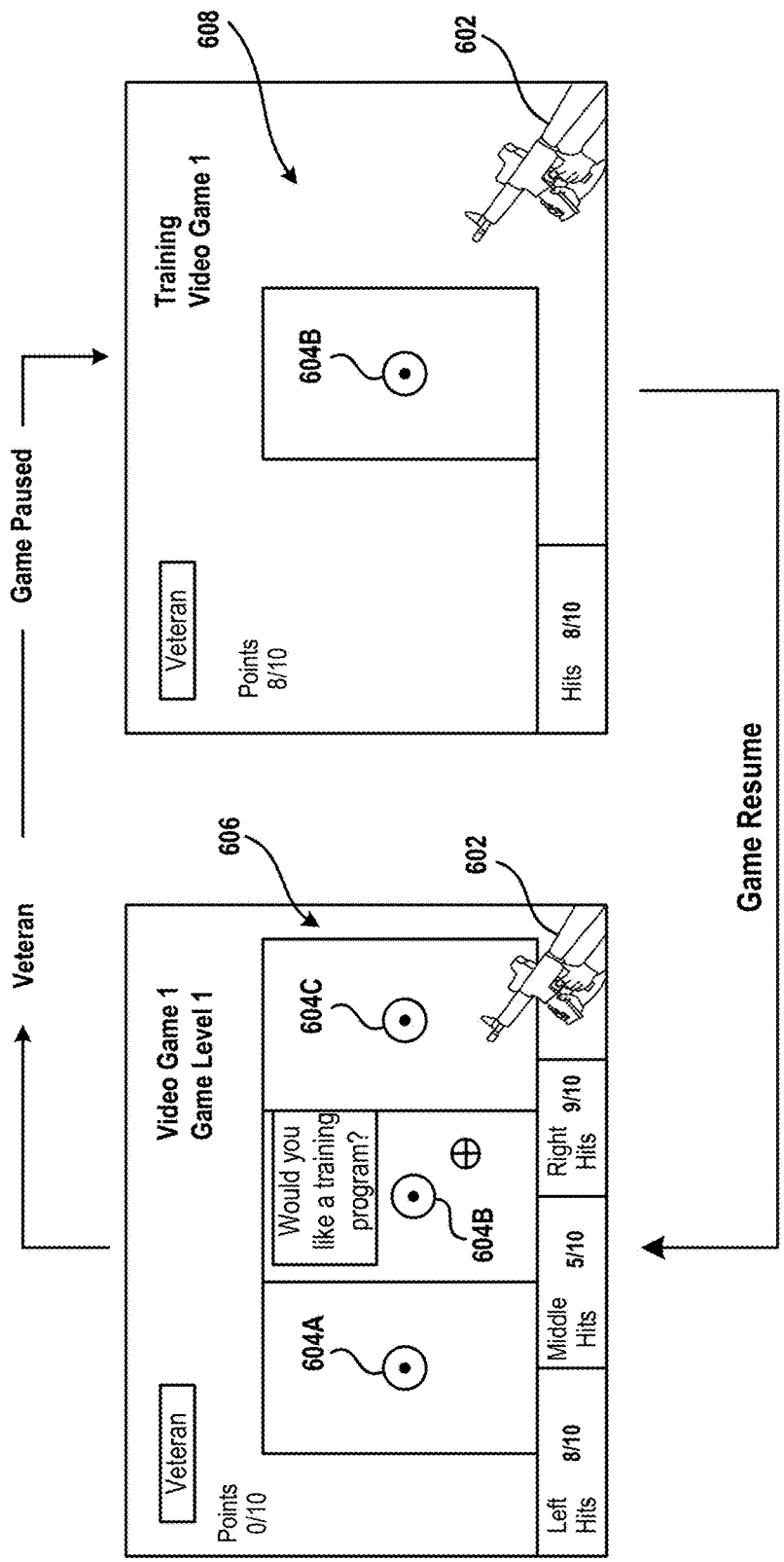
FIG. 6A is a diagram to illustrate a transition from a virtual scene of a video game to a virtual scene of a training video game, and a transition back to the virtual scene of the video game from the virtual scene of the training video game.

FIG. 6A is a diagram to illustrate a transition from a virtual scene 606 of a video game 1 to a virtual scene 608 of a training video game 1, and a transition back to the virtual scene 606 of the video game 1 from the virtual scene 608 of the training video game 1. The video game 1 is an example of the video game 102 of FIG. 1. Moreover the training video game 1 is an example of the training video game 108. The virtual scene 606 includes multiple virtual targets 604A, 604B, and 604C. The virtual scene 608 includes the virtual target 604B.

As shown, during execution of the video game 1, the user 1, via the user account 1, accumulates 5/10 middle hits. The middle hits indicate that the virtual target 604B in the middle portion of the display screen of the client device 1 is hit with 5 out of 10 virtual bullets that are dislodged from a virtual gun 602. The user 1 uses the input device of the client device 1 to operate the virtual gun 602. For example, the user 1 selects a button on the hand-held controller to operate the virtual gun 602 to shoot the virtual target 604B or makes a gesture, which is captured by the camera as a selection of a trigger of the virtual gun 602 to shoot the virtual target 604B.

Similarly, during execution of the video game 1, the user 1, via the user account 1, accumulates 8/10 left hits. The left hits indicate that the virtual target 604A in the left portion of the display screen of the client device 1 is hit with 8 out of 10 virtual bullets that are dislodged from the virtual gun 602. Also, during execution of the video game 1, the user 1, via the user account 1, accumulates 9/10 right hits. The right hits indicate that the virtual target 604C in the right portion of the display screen of the client device 1 is hit with 9 out of 10 virtual bullets that are dislodged from the virtual gun 602.

A trait level or a skill level associated with the user account 1 is determined by the monitoring module 120 of FIG. 1 to be veteran based on the number of middle hits. Other examples of the trait level or the skill level include novice and expert. For example, when each of the left hits, the middle hits, and the right hits is less than 4/10, the user account 1 is determined to be novice by the monitoring module 120. In this example, when each of the left hits, the middle hits, and the right hits is greater than 7/10, a user profile of the user account 1 is determined to be expert by the monitoring module 120. Continuing with the example, when each of the left hits, the middle hits, and the right hits is between 4/10 and 7/10, the user account 1 is determined to be veteran by the monitoring module 120. It should be noted that a trait level or a skill level or a nomenclature assigned to the trait level of the skill level associated with a user account of a user is stored in a user profile of the user account.

Upon determining that the trait level or the skill level associated with the user account 1 is veteran, the monitoring module 120 sends a signal to the game execution module 116 to pause execution of the video game 1 and sends another signal to the training video game module 118 of FIG. 1 to initiate execution of the training video game 1. Upon receiving the signal, the training video game module 118 executes the training video game 1. The training video game 1 includes the virtual target 604B but excludes the virtual targets 604A and 604C. The user 1 is to be trained in a task of shooting the virtual target 604B but not the virtual targets 604A and 604B. As such, the training video game module 118 does not apply the virtual targets 604A and 604C in the virtual scene 608.

During execution of the training video game 1, the monitoring module 120 determines whether a number of hits of the virtual target 604B exceeds 7/10. The number of hits of the virtual target 604B is an example of the trait level or the skill level. Upon determining that the number of hits of the virtual target 604B exceeds 7/10, the monitoring module 120 sends a signal to the game execution module 116 to continue execution of the video game 1 at a point in time at which the video game 1 is paused or to a point in time, such as a pre-determined number of seconds or minutes, before the time the video game 1 is paused.

Figure 6B:
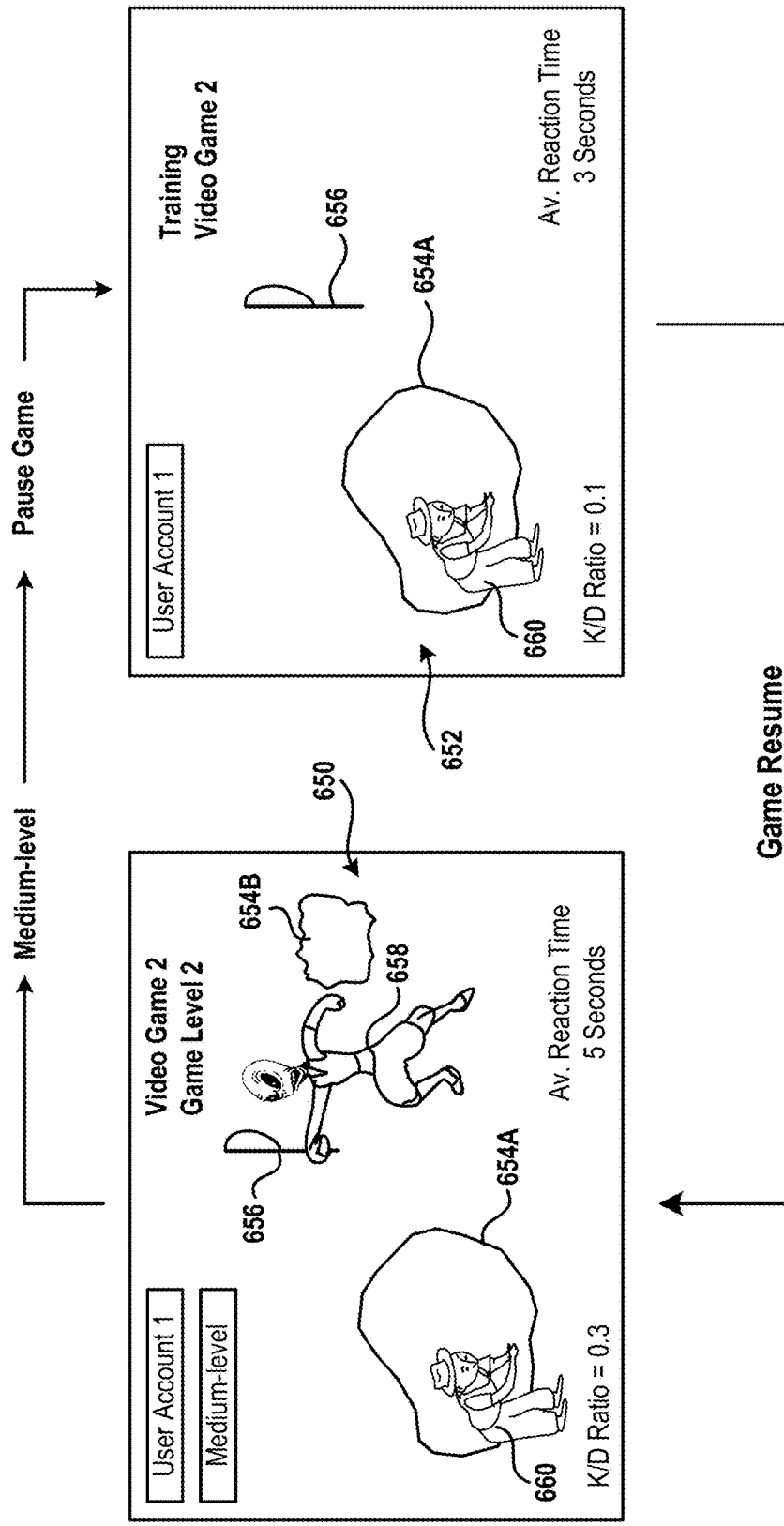
FIG. 6B is a diagram to illustrate a transition from a virtual scene of a video game to a virtual scene of a training video game, and a transition back to the virtual scene of the video game from the virtual scene of the training video game.

FIG. 6B is a diagram to illustrate a transition from a virtual scene 650 of a video game 2 to a virtual scene 652 of a training video game 2, and a transition back to the virtual scene 650 of the video game 2 from the virtual scene 652 of the training video game 2. The video game 2 is an example of the video game 102 of FIG. 1. Moreover the training video game 2 is an example of the training video game 108. The virtual scene 650 includes multiple virtual boulders 654A and 654B, a virtual weapon 656, a virtual alien 658, and a virtual user 660 that represents the user 1. The virtual scene 652 includes the virtual boulder 654A, the virtual weapon 656, and the virtual user 660.

As shown, during execution of the video game 2, the user 1, via the user account 1, has an average reaction time of 5 seconds. For example, an average of reaction times for crouching behind the virtual boulder 654A to avoid 10 zaps powered by the virtual weapon 656 is 5 seconds. Also, the slow reaction time of 5 seconds results in a kill to death ratio of 0.3. The user 1 uses the input device to crouch behind the virtual boulder 654A. For example, the user 1 selects a button on the hand-held controller to allow the virtual user 660 to bend to crouch behind the virtual boulder 654A or makes a gesture, which is captured by the camera to bend to crouch the virtual user 660 behind the virtual boulder 654A.

A trait level or a skill level associated with the user account 1 is determined by the monitoring module 120 of FIG. 1 to be of a medium-level based on the reaction rate. Other examples of the trait level or the skill level include low-level and high-level. For example, when the reaction rate is measured to be 3 seconds or less, the trait level or the skill level is of the high-level. As another example, when the reaction rate is measured to be 8 seconds or less, the trait level or the skill level is of the low-level. When the reaction rate is measured to be between 3 and 8 seconds, the trait level or the skill level is of the medium-level Upon determining that the trait level or the skill level associated with the user account 1 is of the medium-level, the monitoring module 120 sends a signal to the game execution module 116 to pause execution of the video game 2 and sends another signal to the training video game module 118 of FIG. 1 to initiate execution of the training video game 2. Upon receiving the signal, the training video game module 118 executes the training video game 2 to generate the virtual scene 652. The virtual scene 652 includes the virtual boulder 654A, the virtual user 660, and the virtual weapon 656 but excludes the virtual boulder 654B and the virtual alien 658. The user 1 is to be trained in a task of crouching quickly behind the virtual boulder 654A but not behind the virtual boulder 654B. As such, the training video game module 118 does not include the virtual boulder 654B in the virtual scene 652.

During execution of the training video game 2, the monitoring module 120 determines whether an average reaction time to react to a pre-determined number of zaps generated from the virtual weapon 656 is less than or equal to 3 seconds. The average reaction time to react to a pre-determined number of zaps is an example of the trait level or the skill level. The average reaction time is an example of the reaction rate. Upon determining that the average reaction time to react to the pre-determined number of zaps is at most 3 seconds, the monitoring module 120 sends a signal to the game execution module 116 to continue execution of the video game 2 at a point in time at which the video game 2 is paused or to a point in time, such as a pre-determined number of seconds or minutes, before the time the video game 2 is paused.

Figure 7:
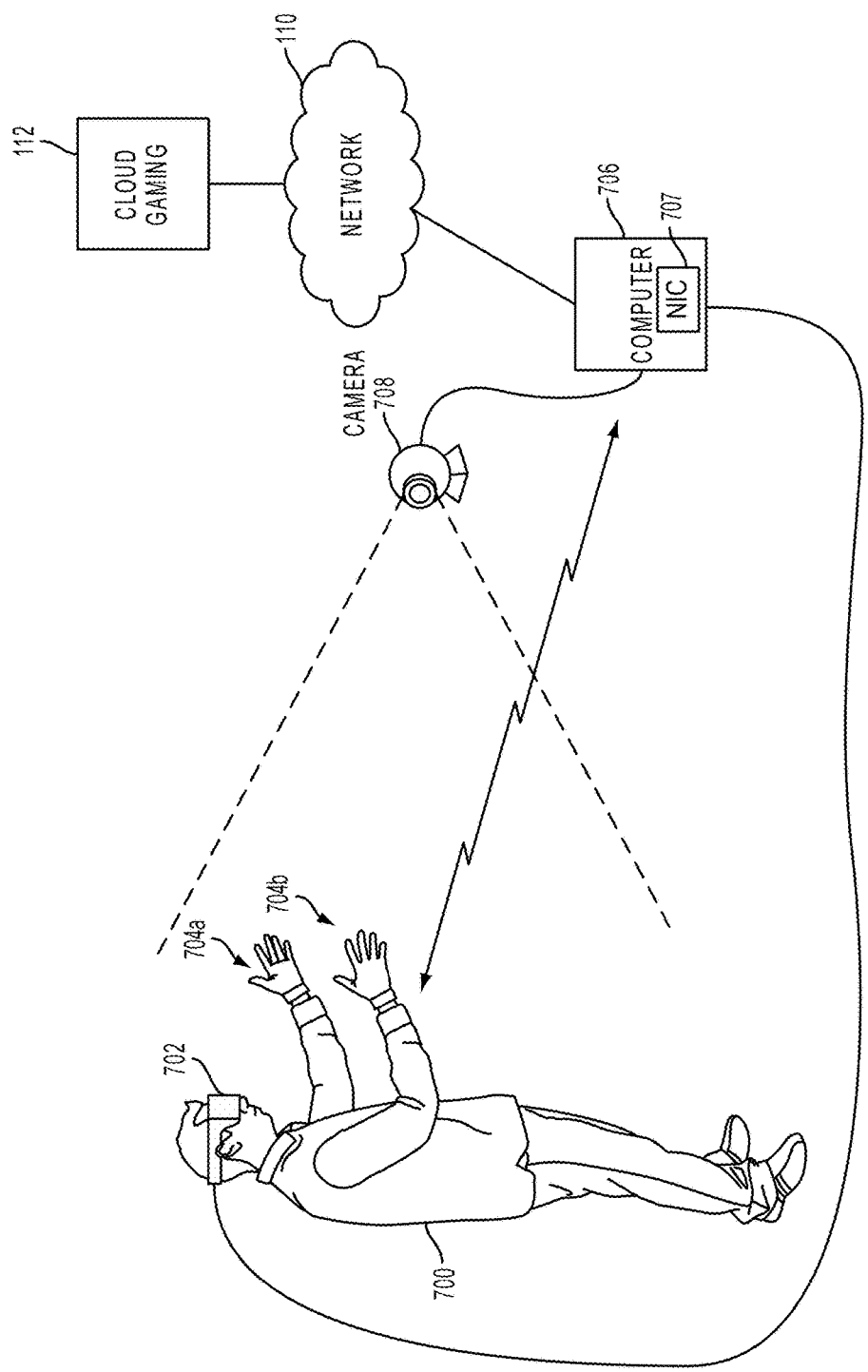
FIG. 7 illustrates a system for interactive gameplay of a video game, in accordance with an embodiment of the present disclosure.

FIG. 7 illustrates a system for interactive gameplay of a video game, such as the video game 102 of FIG. 1, in accordance with an embodiment of the disclosure. A user 700, such as the user 1 or the user 2 or the user 3, is shown wearing a head-mounted display (HMD) 702. The HMD 702 is worn in a manner similar to glasses, goggles, or a helmet, and is configured to display a virtual environment to the user 700. Examples of a virtual environment include a virtual reality scene or an augmented reality scene. The virtual environment is of a video game, such as the video game 102.

The HMD 702 provides a very immersive experience to the user by virtue of its provision of display mechanisms in close proximity to the user's eyes. Thus, the HMD 702 can provide display regions to each of the user's eyes which occupy large portions or even the entirety of the field of view of the user.

In one embodiment, the HMD 702 is connected to a computer 706, which includes a network interface controller 707 to apply the external communication protocol. The connection to computer 706 is wired or wireless. Examples of a wired connection, as used herein, include a parallel transfer connection, a serial transfer connection, and a universal serial bus (USB) connection. Examples of a wireless connection, as used herein, include a Bluetooth™ connection. The computer 706 is any general or special purpose computer known in the art, including but not limited to, a gaming console, personal computer, laptop, tablet computer, mobile device, cellular phone, tablet, thin client, set-top box, media streaming device, etc. In one embodiment, the computer 706 executes a video game, and outputs video and audio generated from the execution of the video game for rendering on one or more display screens of the HMD 702.

In some embodiments, the user 700 wears and operates a glove interface object 704a to provide input for the video game. Additionally, a camera 708 captures images of a real-world interactive environment in which the user 700 is located. The camera 708 is defined to include one or more image capture devices, such as a stereoscopic pair of cameras, an infrared (IR) camera, a depth camera, or a combination thereof. In an embodiment, the camera 708 is located within the computer 706. Examples of the real-world interactive environment include an enclosed space, a room, a warehouse, and a floor of a building. These captured images are analyzed to determine a location and movements of the user 700, the HMD 702, and the glove interface object 704a. In one embodiment, the glove interface object 704a includes a light which is tracked or markers that are tracked to determine its location and orientation.

As described below, a way the user 700 interfaces with the virtual environment displayed on the HMD 702 varies, and other interface devices in addition to glove interface objects 704a, are optionally used. For instance, single-handed controllers are used, as well as two-handed controllers. In some embodiments, the controllers are tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual environment presented on the HMD 702.

Additionally, in some embodiments, the HMD 702 includes one or more lights which can be tracked to determine a location and orientation of the HMD 702. The HMD 702 includes one or more microphones to capture sound from the real-world interactive environment. In some embodiments, the microphones are separate from the HMD 702, e.g., integrated within the camera 708, etc. Sound captured by a microphone array is processed to identify a location of a sound source. Sound from an identified location is selectively utilized or processed to the exclusion of other sounds not from the identified location.

In another embodiment, the computer 706 functions as a thin client in communication over the computer network 110 with a cloud gaming provider 712. Examples of the computer network 110 include a local area network such as an Intranet, or a wide area network such as the Internet, or a combination thereof. The cloud gaming provider 712 is a server system that includes one or more servers for execution of the video game. In an embodiment, the cloud gaming provider 712 is a virtual machine. The cloud gaming provider 712 maintains and executes the video game being played by the user 702. The computer 706 transmits inputs from the HMD 702, the glove interface object 704a, and/or the camera 708, to the cloud gaming provider 712, which processes the inputs to affect a game state of the video game. An output from the video game, such as video data, audio data, and haptic feedback data, is transmitted to the computer 706. The computer 706 further processes the output before transmission or directly transmits the output to relevant devices. For example, video and audio data streams are provided to the HMD 702, whereas a vibration feedback command is provided to the glove interface object 704a.

In one embodiment, the HMD 702, the glove interface object 704a, and the camera 708, are networked devices that connect to the computer network 110 to communicate with the cloud gaming provider 712. For example, the computer 706 is a local network device, such as a router, that does not otherwise perform video game processing, but which facilitates passage of network traffic. The connections between the computer network 110 and the HMD 702, glove interface object 704a, or the camera 708 are wired or wireless.

In one embodiment, the HMD 702, the glove interface objects 704a and 704b, the camera 708, and the computer 706 are parts of a client device, such as the client device 1 or 2 or 3 of FIG. 1.

Additionally, though embodiments in the present disclosure are described with reference to a head-mounted display, it will be appreciated that in other embodiments, non-head mounted displays are used instead, including without limitation, a television, projector, liquid crystal display (LCD) display screen, portable device screen (e.g. tablet, smartphone, laptop, etc.) or any other type of display that render video and/or provide for display of the virtual environment in accordance with the present embodiments.

Figure 8:
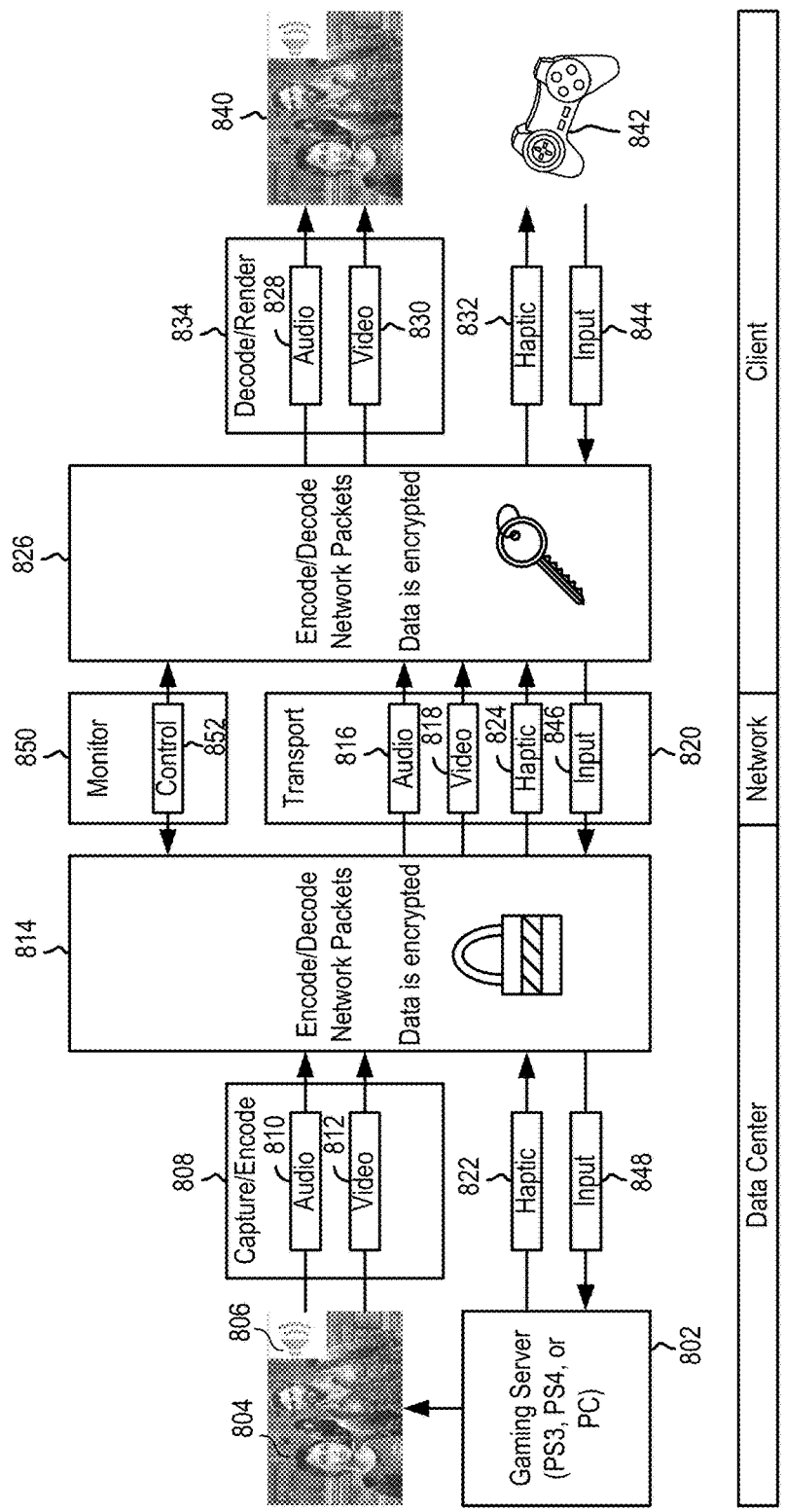
FIG. 8 is a flow diagram conceptually illustrating various operations which are performed for streaming a cloud video game to a client device, in accordance with an embodiment of the present disclosure.

FIG. 8 is a flow diagram conceptually illustrating various operations which are performed for streaming a cloud video game to a client device, in accordance with implementations of the disclosure. A game server 802 executes a video game and generates raw (uncompressed) video 804 and audio 806. The game server 802 is an example of the server 106 of FIG. 1. The video 804 and audio 806 are captured and encoded for streaming purposes, as indicated at reference 808 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 810 and encoded video 812 are further packetized into network packets, as indicated at reference numeral 814, for purposes of transmission over the computer network such as the Internet. In some embodiments, the network packet encoding process also employs a data encryption process, thereby providing enhanced data security. In the illustrated implementation, audio packets 816 and video packets 818 are generated for transport over a computer network 820.

The game server 802 additionally generates haptic feedback data 822, which is also packetized into network packets for network transmission. In the illustrated implementation, haptic feedback packets 824 are generated for transport over the computer network 820.

The foregoing operations of generating the raw video and audio and the haptic feedback data are performed on the game server 802 of a data center, and the operations of encoding the video and audio, and packetizing the encoded audio/video and haptic feedback data for transport are performed by the streaming engine of the data center. As indicated at reference 820, the audio, video, and haptic feedback packets are transported over the computer network. As indicated at reference 826, the audio packets 816, video packets 818, and haptic feedback packets 824, are disintegrated, e.g., parsed, etc., by a client device to extract encoded audio 828, encoded video 830, and haptic feedback data 832 at the client device from the network packets. If data has been encrypted, then the data is also decrypted. The encoded audio 828 and encoded video 830 are then decoded by the client device, as indicated at reference 834, to generate client-side raw audio and video data for rendering on a display device 840 of the client device. The haptic feedback data 832 is processed by the processor of the client device to produce a haptic feedback effect at a controller device 842 or other interface device, e.g., the HMD, etc., through which haptic effects can be rendered. One example of a haptic effect is a vibration or rumble of the controller device 842. The controller 842 or the other interface device is an example of a part of the client device 1 or 2 or 3 of FIG. 1.

It will be appreciated that a video game is responsive to user inputs, and thus, a similar procedural flow to that described above for transmission and processing of user input, but in the reverse direction from client device to server, is performed. As shown, a controller device 842 or another input device, e.g., the body part of the user 1, etc., or a combination thereof generates input data 844. This input data 844 is packetized at the client device for transport over the computer network to the data center. Input data packets 846 are unpacked and reassembled by the game server 802 to define input data 848 on the data center side. The input data 848 is fed to the game server 802, which processes the input data 848 to update save data for a game state of the game.

During transport via the computer network 820 of the audio packets 816, the video packets 818, and haptic feedback packets 824, in some embodiments, the transmission of data over the computer network 820 is monitored to ensure a quality of service. For example, network conditions of the computer network 820 are monitored as indicated by reference 850, including both upstream and downstream network bandwidth, and the game streaming is adjusted in response to changes in available bandwidth. That is, the encoding and decoding of network packets is controlled based on present network conditions, as indicated by reference 852.

Figure 9:
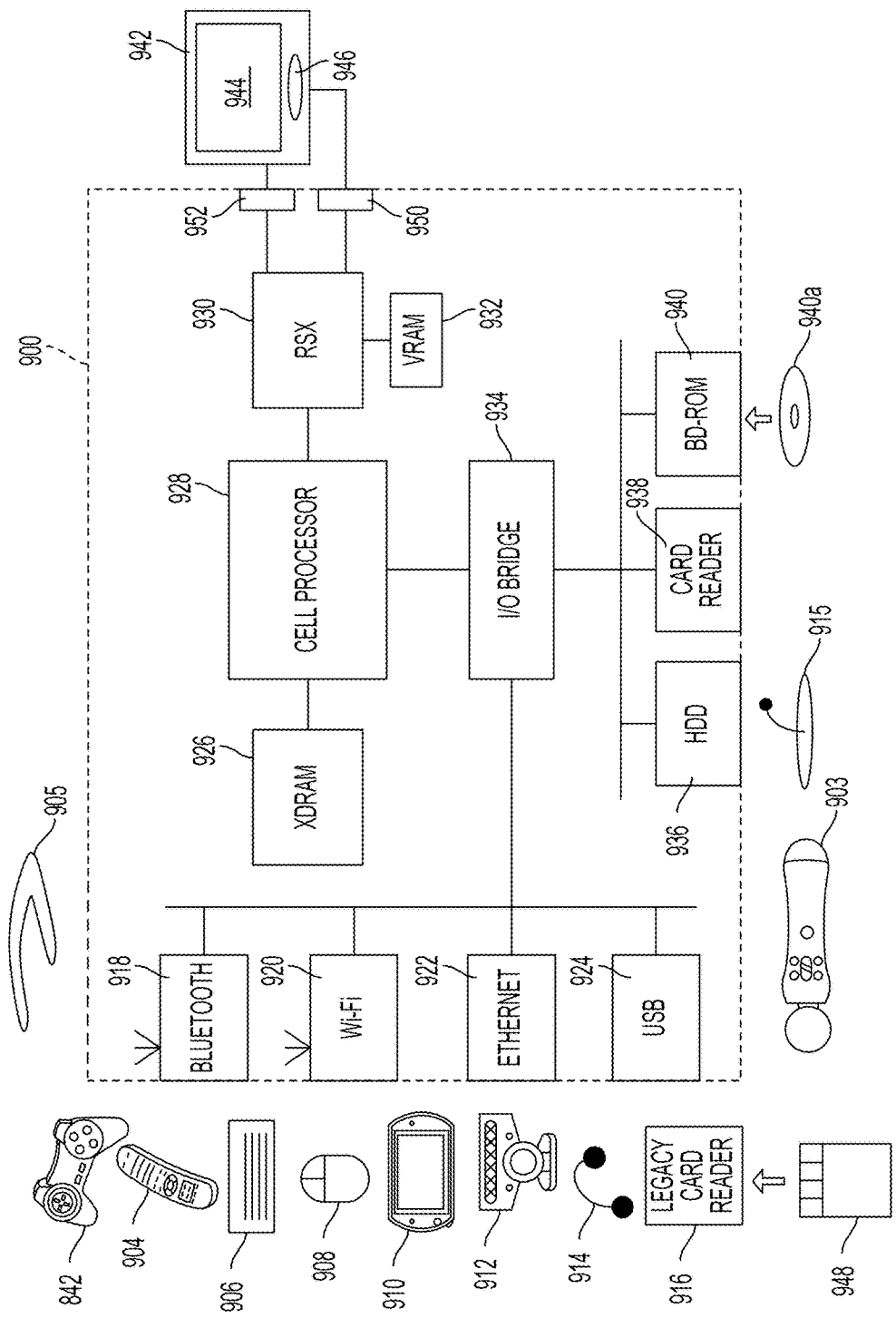
FIG. 9 is a block diagram of an embodiment of a game console that is compatible for interfacing with a display device of a client device and is capable of communicating via a computer network with a game hosting system.

FIG. 9 is a block diagram of an embodiment of a game console 900 that is compatible for interfacing with the display device of the client device and is capable of communicating via the computer network 1020 with the game hosting system. The game console 900 is located within a data center A or is located at a location at which the user 1 is located. In some embodiments, the game console 900 is used to execute a game that is displayed on the HMD. The game console 900 is provided with various peripheral devices connectable to the game console 900. The game console 900 has a cell processor 928, a dynamic random access memory (XDRAM) unit 926, a Reality Synthesizer graphics processor unit 930 with a dedicated video random access memory (VRAM) unit 932, and an input/output (I/O) bridge 934. The game console 900 also has a Blu Ray® Disk read-only memory (BD-ROM) optical disk reader 940 for reading from a disk 940a and a removable slot-in hard disk drive (HDD) 936, accessible through the I/O bridge 934. Optionally, the game console 900 also includes a memory card reader 938 for reading compact flash memory cards, memory Stick® memory cards and the like, which is similarly accessible through the I/O bridge 934. The I/O bridge 934 also connects to Universal Serial Bus (USB) 2.0 ports 924, a gigabit Ethernet port 922, an IEEE 802.11b/g wireless network (Wi-Fi) port 920, and a Bluetooth® wireless link port 918 capable of supporting Bluetooth connections.

In operation, the I/O bridge 934 handles all wireless, USB and Ethernet data, including data from game controllers 842 and/or 903 and from the HMD 905. For example, when the user A is playing a game generated by execution of a portion of a game code, the I/O bridge 934 receives input data from the game controllers 842 and/or 903 and/or from the HMD 905 via a Bluetooth link and directs the input data to the cell processor 928, which updates a current state of the game accordingly. As an example, a camera within the HMD 905 captures a gesture of the user 1 to generate an image representing the gesture. The image is an example of the input data. Each game controller 842 and 903 is an example of a hand-held controller (HHC).

The wireless, USB and Ethernet ports also provide connectivity for other peripheral devices in addition to game controllers 842 and 903 and the HMD 905, such as, for example, a remote control 904, a keyboard 906, a mouse 908, a portable entertainment device 910, such as, e.g., a Sony Playstation Portable® entertainment device, etc., a video camera, such as, e.g., an EyeToy® video camera 912, etc., a microphone headset 914, and a microphone 915. In some embodiments, such peripheral devices are connected to the game console 900 wirelessly, for example, the portable entertainment device 910 communicates via a Wi-Fi ad-hoc connection, whilst the microphone headset 914 communicates via a Bluetooth link.

The provision of these interfaces means that the game console 900 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 916 is connected to the game console 900 via the USB port 924, enabling the reading of memory cards 948 of a kind used by the game console 900. The game controllers 842 and 903 and the HMD 905 are operable to communicate wirelessly with the game console 900 via the Bluetooth link 918, or to be connected to the USB port 924, thereby also receiving power by which to charge batteries of the game controller 842 and 903 and the HMD 905. In some embodiments, each of the game controllers 842 and 903 and the HMD 905 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 900, and wireless devices using protocols, such as, e.g., Bluetooth, Wi-Fi, etc.

The game controller 842 is a controller designed to be used with two hands of the user 1, and game controller 903 is a single-hand controller with an attachment. The HMD 905 is designed to fit on top of a head and/or in front of eyes of the user 1. In addition to one or more analog joysticks and conventional control buttons, each game controller 842 and 903 is susceptible to three-dimensional location determination. Similarly, the HMD 905 is susceptible to three-dimensional location determination. Consequently, in some embodiments, gestures and movements by the user 1 of the game controller 842 and 903 and of the HMD 905 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 904 is also operable to communicate wirelessly with the game console 900 via the Bluetooth link 918. The remote control 904 includes controls suitable for the operation of the Blu Ray™ Disk BD-ROM reader 940 and for navigation of disk content.

The Blu Ray™ Disk BD-ROM reader 940 is operable to read CD-ROMs compatible with the game console 900, in addition to conventional pre-recorded and recordable CDs, and so-called Super Audio CDs. The Blu Ray™ Disk BD-ROM reader 940 is also operable to read digital video disk-ROMs (DVD-ROMs) compatible with the game console 900, in addition to conventional pre-recorded and recordable DVDs. The Blu Ray™ Disk BD-ROM reader 940 is further operable to read BD-ROMs compatible with the game console 900, as well as conventional pre-recorded and recordable Blu-Ray Disks.

The game console 900 is operable to supply audio and video, either generated or decoded via the Reality Synthesizer graphics unit 930, through audio connectors 950 and video connectors 952 to a display and sound output device 942, such as, e.g., a monitor or television set, etc., having a display screen 944 and one or more loudspeakers 946, or to supply the audio and video via the Bluetooth® wireless link port 918 to the display device of the HMD 905. The audio connectors 950, in various embodiments, include conventional analogue and digital outputs whilst the video connectors 952 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 908. An operating system of the game console 900 supports Dolby® 5.1 surround sound, Dolby® Theatre Surround (DTS), and the decoding of 7.1 surround sound from Blu-Ray® disks.

In some embodiments, a video camera, e.g., the video camera 912, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 900. An LED indicator of the video camera 912 is arranged to illuminate in response to appropriate control data from the game console 900, for example, to signify adverse lighting conditions, etc. Some embodiments of the video camera 912 variously connect to the game console 900 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 900, an appropriate piece of software, such as, a device driver, etc., is provided.

In some embodiments, the aforementioned system devices, including the game console 900, the HHC, and the HMD 905 enable the HMD 905 to display and capture video of an interactive session of a game. The system devices initiate an interactive session of a game, the interactive session defining interactivity between the user 1 and the game. The system devices further determine an initial position and orientation of the HHC and/or the HMD 905 operated by the user 1. The game console 900 determines a current state of a game based on the interactivity between the user 1 and the game. The system devices track a position and orientation of the HHC and/or the HMD 905 during an interactive session of the user 1 with a game. The system devices generate a spectator video stream of the interactive session based on a current state of a game and the tracked position and orientation of the HHC and/or the HMD 905. In some embodiments, the HHC renders the spectator video stream on a display screen of the HHC. In various embodiments, the HMD 905 renders the spectator video stream on a display screen of the HMD 905.

It should be noted that in one embodiment, each of the head-mounted display 905, the game console 900, the game controller 903, the remote control 904, the keyboard 906, the mouse 908, the portable entertainment device 910, the EyeToy® video camera 912, the microphone headset 914, the microphone 915, and the display and sound output device 942 are parts of the client device 1, or 2, or 3.

Figure 10:
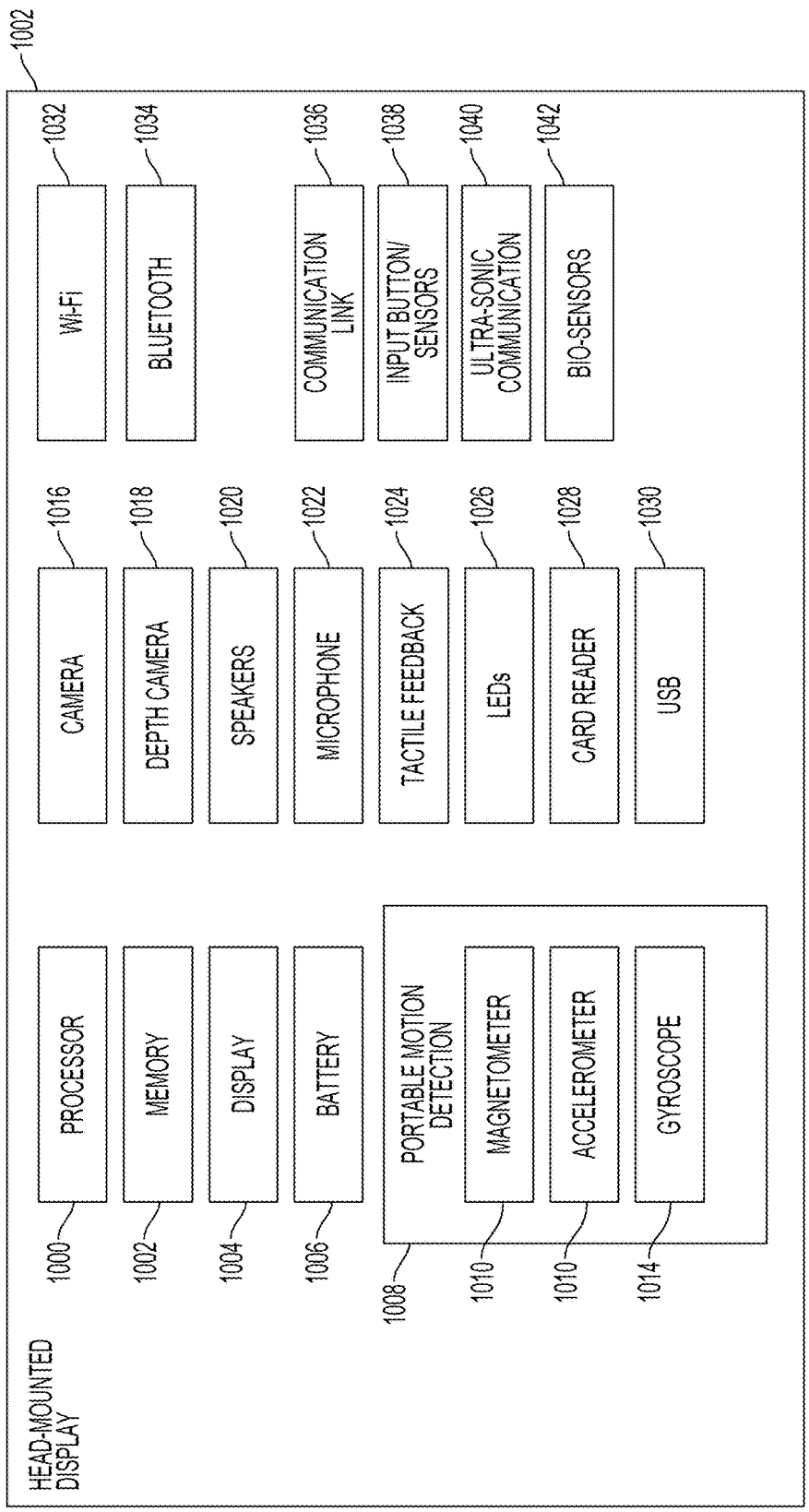
FIG. 10 a diagram illustrating components of a head-mounted display, in accordance with an embodiment of the present disclosure.

With reference to FIG. 10, a diagram illustrating components of an HMD 1002 is shown. The HMD 1002 is an example of the HMD 1105 (FIG. 11). A memory device 1002 is provided for storage purposes. Examples of the memory device 1002 include a volatile memory, a non-volatile memory, or a combination thereof. A display device 1004 is included which provides a visual interface, e.g., display of image frames generated from save data, etc., that the user 1 (FIG. 1) views. A battery 1006 is provided as a power source for the HMD 1002. A motion detection module 1008 includes any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles, e.g., world-space pitch and world-space roll, etc.

A magnetometer measures a strength and a direction of a magnetic field in a vicinity of the HMD 1002. In some embodiments, three magnetometers 1010 are used within the HMD 1002, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1014, a camera 1016, etc. In one embodiment, the accelerometer 1012 is used together with magnetometer 1010 to obtain the inclination and azimuth of the HMD 1002.

A gyroscope is a device for measuring or maintaining orientation, based on the principles of angular momentum. In one embodiment, instead of the gyroscope 1014, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1016 is provided for capturing images and image streams of a real-world environment, e.g., room, cabin, natural environment, etc., surrounding the user 1. In various embodiments, more than one camera is included in the HMD 1002, including a camera that is rear-facing, e.g., directed away from the user 1 when the user 1 is viewing the display of the HMD 1002, etc., and a camera that is front-facing, e.g., directed towards the user 1 when the user 1 is viewing the display of the HMD 1002, etc. Additionally, in several embodiments, a depth camera 1018 is included in the HMD 1002 for sensing depth information of objects in the real-world environment.

The HMD 1002 includes speakers 1020 for providing audio output. Also, a microphone 1022 is included, in some embodiments, for capturing audio from the real-world environment, including sounds from an ambient environment, and speech made by the user 1, etc. The HMD 1002 includes a tactile feedback module 1024, e.g., a vibration device, etc., for providing tactile feedback to the user 1. In one embodiment, the tactile feedback module 1024 is capable of causing movement and/or vibration of the HMD 1002 to provide tactile feedback to the user 1.

LEDs 1026 are provided as visual indicators of statuses of the HMD 1002. For example, an LED may indicate battery level, power on, etc. A card reader 1028 is provided to enable the HMD 1002 to read and write information to and from a memory card. A USB interface 1030 is included as one example of an interface for enabling connection of peripheral devices, or connection to other devices, such as other portable devices, computers, etc. In various embodiments of the HMD 1002, any of various kinds of interfaces may be included to enable greater connectivity of the HMD 1002.

A Wi-Fi module 1032 is included for enabling connection to the Internet via wireless networking technologies. Also, the HMD 1002 includes a Bluetooth module 1034 for enabling wireless connection to other devices. A communications link 1036 is also included, in some embodiments, for connection to other devices. In one embodiment, the communications link 1036 utilizes infrared transmission for wireless communication. In other embodiments, the communications link 1036 utilizes any of various wireless or wired transmission protocols for communication with other devices.

Input buttons/sensors 1038 are included to provide an input interface for the user 1 (FIG. 1). Any of various kinds of input interfaces are included, such as buttons, touchpad, joystick, trackball, etc. An ultra-sonic communication module 1040 is included, in various embodiments, in the HMD 1002 for facilitating communication with other devices via ultra-sonic technologies.

Bio-sensors 1042 are included to enable detection of physiological data from a user. In one embodiment, the bio-sensors 1042 include one or more dry electrodes for detecting bio-electric signals of the user through the user's skin.

The foregoing components of HMD 1002 have been described as merely exemplary components that may be included in HMD 1002. In various embodiments, the HMD 1002 include or do not include some of the various aforementioned components.

In one embodiment, the HMD 1002 is an example of the client device 1, or 2, or 3 of FIG. 1.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
executing a video game;
determining, during the execution of the video game, whether a skill level of a user is below a threshold level of play;
predicting a deterioration in the skill level for a plurality of tasks remaining to be performed in the video game;
generating a current task that relates to a current level of play of the video game in which the skill level is below the threshold level;
transitioning the video game to a training video game program having the current task to increase the current level of play, wherein said transitioning to the training video game program occurs upon said predicting the deterioration in the skill level;
executing the training video game program;
monitoring the skill level for the current task in the training video game program;
determining, during the execution of the training video game program, whether the skill level for the current task exceeds the threshold level; and
returning to an execution of the video game upon determining that the skill level for the current task exceeds the threshold level.

2. The method of claim 1, further comprising continuing the training video game program upon determining that the skill level for the current task does not exceed the threshold level.

3. The method of claim 1, further comprising pausing the video game upon determining that the skill level of the user is below the threshold level of play and before transitioning the video game to the training video game program.

4. The method of claim 3, wherein returning to the execution of the video game is performed to a point in time before a state at which the video game is paused.

5. The method of claim 1, further comprising determining whether to generate an additional task based on said predicting of the deterioration in the skill level, wherein the additional task is one of the plurality of tasks remaining to be performed in the video game after a time of said transitioning of the video game to the training video game program.

6. The method of claim 5, wherein the training video game program has the additional task.

7. The method of claim 1, wherein the threshold level is determined based on a comparison of the skill level of the user during execution of a game level of the video game with a plurality of skill levels of multiple users during execution of the game level of the video game.

8. The method of claim 1, wherein during the execution of the training video game program, an intensity for performance of the task is increased.

9. The method of claim 1, further comprising:
receiving an indication of execution of the video game;
determining whether a trait level of the user is below a pre-determined level of play;

generating a plurality of additional tasks that relate to a play level in which the trait level is below the pre-determined level;

executing a training video game program having the plurality of additional tasks to increase the play level;

monitoring the trait level for the plurality of additional tasks in the training video game program;

determining whether the trait level for the plurality of additional tasks is above the pre-determined level; and continuing the training video game program having the plurality of additional tasks upon determining that the trait level is below the pre-determined level.

10. The method of claim 9, further comprising executing the video game upon determining that the trait level for the plurality of additional tasks is above the pre-determined level.

11. A server comprising:
a processor configured to:
execute a video game;
determine, during the execution of the video game, whether a skill level of a user is below a threshold level of play;
predict a deterioration in the skill level for a plurality of tasks remaining to be performed in the video game;
generate a current task that relates to a current level of play of the video game in which the skill level is below the threshold level;
transition the video game to a training video game program having the current task to increase the current level of play, wherein the transition to the training video game program occurs in response to the prediction of the deterioration in the skill level;
execute the training video game program;
monitor the skill level for the current task in the training video game program;
determine, during the execution of the training video game program, whether the skill level for the current task exceeds the threshold level; and
return to an execution of the video game upon determining that the skill level for the current task exceeds the threshold level; and
a memory device coupled to the processor for storing the skill level and the threshold level.

12. The server of claim 11, wherein the processor is configured to continue the training video game program upon determining that the skill level for the current task does not exceed the threshold level.

13. The server of claim 11, wherein the processor is configured to pause the video game upon determining that the skill level of the user is below the threshold level of play and before the transition of the video game to the training video game program.

14. The server of claim 13, wherein the processor is configured to return the execution of the video game to a point in time before a state at which the video game is paused.

15. The server of claim 11, wherein the processor is configured to determine whether to generate an additional task based on the prediction of the deterioration in the skill level, wherein the additional task is one of the plurality of tasks remaining to be performed in the video game after a time of the transition of the video game to the training video game program.

16. The server of claim 15, wherein the training video game program has the additional task.

17. The server of claim 11, wherein the threshold level is determined based on a comparison of the skill level of the user during execution of a game level of the video game with a plurality of skill levels of multiple users during execution of the game level of the video game.

18. The server of claim 11, wherein during the execution of the training video game program, an intensity for performance of the current task is increased.

19. The server of claim 11, wherein the processor is configured to:
receive an indication of execution of the video game;
determine whether a trait level of the user is below a pre-determined level of play;
generate a plurality of additional tasks that relate to a play level in which the trait level is below the pre-determined level;
execute a training video game program having the plurality of additional tasks to increase the play level;
monitor the trait level for the plurality of additional tasks in the training video game program;
determine whether the trait level for the plurality of additional tasks is above the pre-determined level; and
continue the training video game program having the plurality of additional tasks upon determining that the trait level is below the pre-determined level.

20. The server of claim 19, wherein the processor is configured to execute the video game upon determining that the trait level for the plurality of additional tasks is above the pre-determined level.

21. A non-transitory computer-readable medium containing program instructions, wherein execution of the program instructions by one or more processors of a computer system causes the one or more processors to carry out a plurality of operations of:
executing a video game;
determining, during the execution of the video game, whether a skill level of a user is below a threshold level of play;
predicting a deterioration in the skill level for a plurality of tasks remaining to be performed in the video game;
generating a current task that relates to a current level of play of the video game in which the skill level is below the threshold level;
transitioning the video game to a training video game program having the current task to increase the current level of play, wherein said transitioning to the training video game program occurs upon said predicting the deterioration in the skill level;
executing the training video game program;
monitoring the skill level for the current task in the training video game program;
determining, during the execution of the training video game program, whether the skill level for the current task exceeds the threshold level; and
returning to an execution of the video game upon determining that the skill level for the current task exceeds the threshold level.

22. The non-transitory computer-readable medium of claim 21, wherein the instructions further include continuing the training video game program upon determining that the skill level for the current task does not exceed the threshold level.

23. The non-transitory computer-readable medium of claim 21, wherein the instructions further include pausing the video game upon determining that the skill level of the user is below the threshold level of play and before transitioning the video game to the training video game program.

* * * * *